US012792636B2

(12) United States Patent
Chodankar et al.

(10) Patent No.: US 12,792,636 B2
(45) Date of Patent: Nov. 10, 2026

(54) PARALLELIZED RULES-BASED AND MACHINE LEARNING-BASED GROUPING ANALYSIS AND PREDICTION

(71) Applicant: Reltio, Inc., Redwood Shores, CA (US)

(72) Inventors: Suchen Chodankar, Redwood City, CA (US); Anshuman Kanwar, Cambridge, MA (US); Manish Sood, Seattle, WA (US); Mohammad Naveed, Woodland, CA (US); Michael Frasca, Durham, NC (US)

(73) Assignee: Reltio, Inc., Redwood Shores, CA (US)

( * ) Notice: Subject to any disclaimer, the term of this patent is extended or adjusted under 35 U.S.C. 154(b) by 0 days.

(21) Appl. No.: 19/000,423

(22) Filed: Dec. 23, 2024

(65) Prior Publication Data

US 2025/0209091 A1 Jun. 26, 2025

Related U.S. Application Data

(60) Provisional application No. 63/614,563, filed on Dec. 23, 2023.

(51) Int. Cl.
*G06F 16/00* (2019.01)
*G06F 16/28* (2019.01)
*G06N 20/00* (2019.01)

(52) U.S. Cl.
CPC ........... *G06F 16/285* (2019.01); *G06N 20/00* (2019.01)

(58) Field of Classification Search
None
See application file for complete search history.

(56) References Cited

U.S. PATENT DOCUMENTS 7,257,602 B2 * 8/2007 Pulst ........................ G06F 17/16 706/45
10,726,060 B1 7/2020 Dutta
(Continued)

OTHER PUBLICATIONS

Search Report and Written Opinion for International Application No. PCT/US2024/060423 dated Feb. 13, 2025.
(Continued)

*Primary Examiner* — Hasanul Mobin
(74) *Attorney, Agent, or Firm* — Ahmann Kloke LLP

(57) ABSTRACT

Among other techniques, techniques for parallelized rules-based and machine learning-based grouping are described. An example method includes: identifying at least two different data records of a plurality of different data records, wherein each data record is associated with a respective entity, wherein each data record includes a plurality of respective record fields and corresponding record field values, and wherein at least a first record field value of a first data record is different from a corresponding first record field value of a second data record; determining, based on a plurality of different grouping rules, whether the respective entity associated with the first data record and the respective entity associated with the second data record comprise a same entity; determining, based on one or more machine learning models, whether the respective entity associated with the first data record and the respective entity associated with the second data record comprise the same entity, wherein the grouping rules-based determination and the machine learning model-based determination are determined in parallel; presenting, in response to the grouping rules-based determination indicating the respective entities are the same entity, a first graphical user interface element of a graphical user interface; presenting a second graphical user interface element of the graphical user interface indicating whether the machine learning-based determination indicates
(Continued)

that the respective entities are the same entity or not the same entity; receiving, through the graphical user interface, a user input; and grouping, based on the user input, the first data record and the second data record.

5 Claims, 20 Drawing Sheets

(56) References Cited

U.S. PATENT DOCUMENTS 12,360,949 B1 * 7/2025 Abhyankar ............. G06F 16/16
2003/0225751 A1 * 12/2003 Kim .................... G06F 16/3329 707/E17.08
2007/0276844 A1 11/2007 Segal
2012/0084317 A1 * 4/2012 Sakamoto ............. G06F 16/162 707/769
2015/0227542 A1 * 8/2015 Thatavarthy .......... G06F 16/215 707/692
2015/0379430 A1 12/2015 Dirac
2017/0091320 A1 3/2017 Psota
2018/0352301 A1 * 12/2018 Tofighbakhsh .... H04N 21/2668
2019/0087467 A1 * 3/2019 Byrne ................... G06F 16/285
2019/0095801 A1 * 3/2019 Saillet ....................... G06N 5/04
2019/0378228 A1 12/2019 Tucker
2020/0364746 A1 * 11/2020 Longano ................ G06N 20/00
2021/0065046 A1 * 3/2021 Lu .......................... G06F 16/901
2021/0065150 A1 * 3/2021 Mathew ................. G06Q 20/20
2021/0240699 A1 8/2021 Smith
2021/0374340 A1 * 12/2021 Li ............................ G06N 5/04
2022/0180988 A1 * 6/2022 Sragow .................. G06Q 40/08
2023/0061746 A1 3/2023 Wei
2023/0169052 A1 * 6/2023 Kukreja ................ G06F 16/215 707/692
2023/0177172 A1 6/2023 Seth
2023/0315737 A1 * 10/2023 Franklin ................. G06F 16/21 707/692
2024/0339226 A1 * 10/2024 Lucas .................... G16H 20/30
2025/0209091 A1 * 6/2025 Chodankar ............ G06N 5/025

OTHER PUBLICATIONS

Search Report and Written Opinion for International Application No. PCT/US2024/061800 dated Apr. 14, 2025.

* cited by examiner

PARALLELIZED RULES-BASED AND MACHINE LEARNING-BASED GROUPING ANALYSIS AND PREDICTION

CROSS-REFERENCE TO RELATED APPLICATIONS

The present application claims priority to U.S. Provisional Patent Application Ser. No. 63/614,563 filed Dec. 23, 2023, which is incorporated by reference herein.

BACKGROUND

Computing systems routinely store and process large amounts of data. Processing such large amounts of data consumes vast amounts of computing resources (e.g., memory, processing speed, network bandwidth, and the like). Computing systems are also typically very inefficient and waste a lot of computing resources when processing such large amounts of data. For example, the data may include different data records for the same entity (e.g., multiple data records for the same employee of an organization), causing the computing system to process many more data records than necessary, which can lead to increased computing requirements (e.g., memory, storage, processors, network bandwidth) and reduced computational speed and efficiency, among other technical problems.

DETAILED DESCRIPTION

Figure 1:
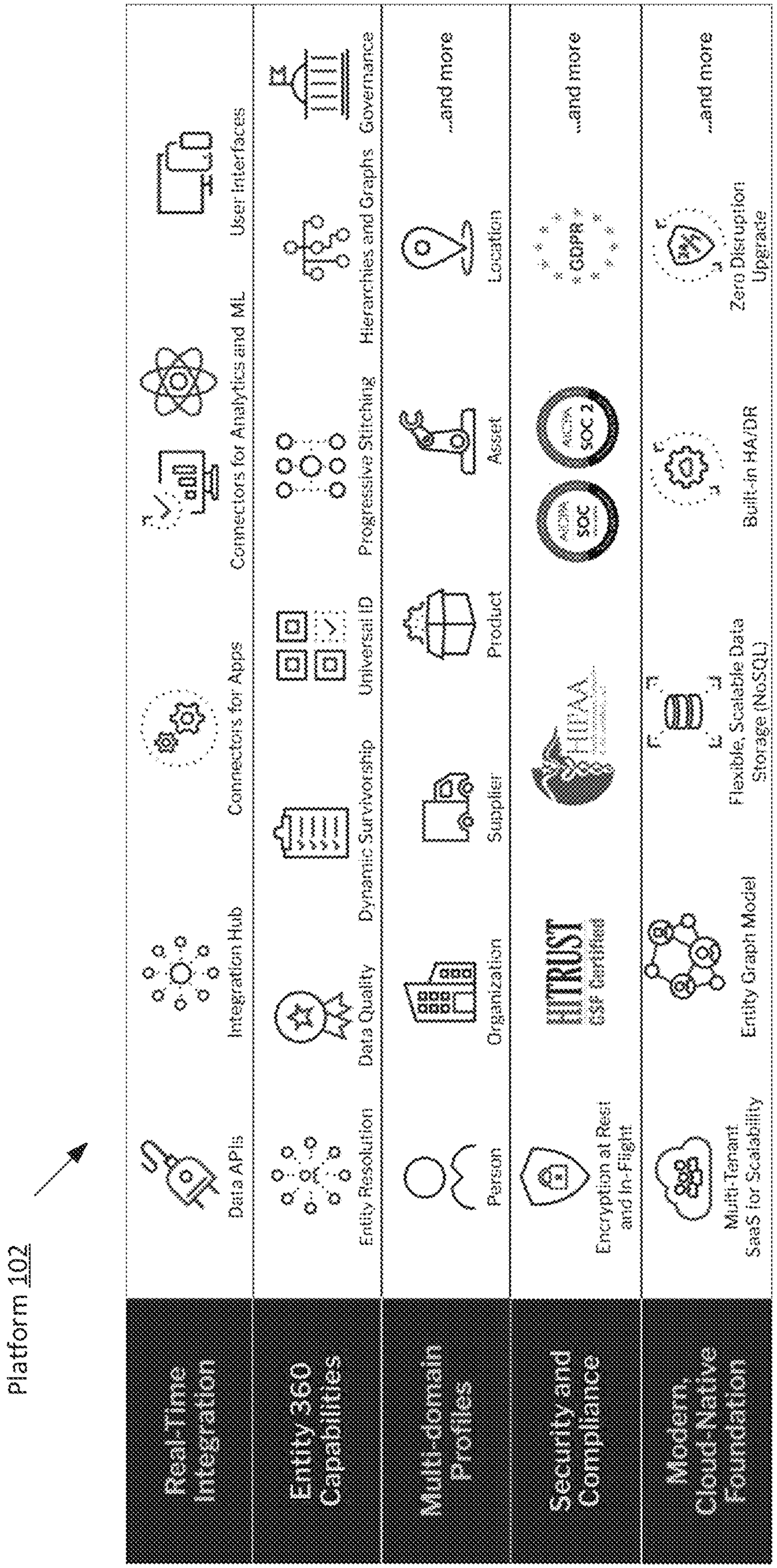
FIG. 1 depicts a connected data platform.

A claimed solution rooted in computer technology overcomes problems specifically arising in the realm of computer technology. In various embodiments, a computing system is configured to identify data records within a set of data records that can be grouped together. More specifically, the computing system can use both grouping rules and machine learning models executing in parallel to identify different data records that may grouped together even when the data records include different data structures, data formats, and/or information. For example, the grouping rules and the machine learning models may both independently be executed to independently determine whether data records should be grouped. The system can present data records that may be grouped and indicate whether the determination was based on the grouping rules and/or the machine learning grouping models. A user can then select based on the determinations whether to group the records (e.g., because they believe the data records should be in the same group). By providing both rules-based and machine learning-based parallelized grouping, the system can more efficiently and accurately identify and group data records, reduce computational requirements (e.g., memory, storage, processors) of subsequent operations on the data records, and provide the user with a higher confidence that data records should be grouped (e.g., relative to a system that was only rules-based or machine learning-based).

In some embodiments, the computing system may also be configured to analyze grouping rules and the performance of those grouping rules in a live production environment. For example, the computing system may identify, on-the-fly, redundant grouping rules (e.g., grouping rules that produce substantially similar results), grouping rules that are too broad in scope (e.g., grouping rules that produce too many grouping results), grouping rules that are too narrow in scope (e.g., grouping rules that produce too few grouping results or grouping rules that are never triggered), and the like. The computing system may then generate, based on one or more machine learning models, one or more recommendations to improve grouping rule performance and grouping results. For example, the computing system may recommend that some grouping rules be merged, deleted, added, modified, and the like.

In various embodiments, a unique architecture enables efficient modelling of entities, relationships, and interactions that typically form the basis of a business. These models enable insights, scalability, and management not previously available in the prior art. It will be appreciated that with the information model discussed herein, there is no need to consider tables, foreign keys, or any of the low-level physicality of how the data is stored.

An information model may be utilized as a part of a multi-tenant platform. In a specific implementation, a configuration sits in a layer on top of the RELTIO® platform and natively enjoys capabilities provided by the platform such as matching, merging, grouping, cleansing, standardization, workflow, and so on. Entities established in a tenant may be associated with custom and/or standard interactions of the platform. The ability to hold and link three kinds of data (i.e., entities, relationships, and interactions) in the platform and leverage the confluence of them in one place provides power to model and understanding to a business.

Entities established in a tenant may be associated with custom and/or standard interactions of the platform. The ability to hold and link three kinds of data (i.e., entities, relationships, and interactions) in the platform and leverage the confluence of them in one place provides unlimited power to model and understanding to a business.

In various embodiments, the metadata configuration is based on an n-layer model. One example is a 3-layer model (e.g., which is the default arrangement). In some embodiments, each layer is represented by a JSON file (although it will be appreciated that many different file structures may be utilized such as BSON or YAML).

The information models may be utilized as a part of a connected, multi-tenant system. FIG. 1 depicts a platform 102. The platform 102 enables seamless scaling in many operational or analytical use case. The platform 102 may be the foundation of master data management (MDM). Various integration options, including a low-code/no-code solution, allow rapid deployment and time to value.

FIG. 1 is an example of functions of the platform 102 in some embodiments. The platform 102 may support best in class MDM capabilities, including identity resolution, data quality, dynamic survivorship for contextual profiles, universal ID across all your operational applications and hierarchies, knowledge graph to manage relationships, progressive stitching to create richer profiles, and governance capabilities. Further, the platform 102 may support high volume transactions, high volume API calls, sophisticated analytics, and back-end jobs for any workload in an auto-scaling cloud environment. As follows, the platform 102 may support high redundancy, fault tolerance, and availability with built-in NoSQL database, Elasticsearch, Spark, and other AWS and GCP services across multiple zones.

In various embodiments, the platform 102 is multi-domain and enables seamless integration of many types of data and from many sources to create master profiles of any data entity—person, organization, product, location. Users can create master profiles for consumers, B2B customers, products, assets, sites, and connect them to see the complete picture.

The platform 102 may enable API-first approach to data integration and orchestration. Users (e.g., tenants) can use APIs, and various application-specific connectors to ease integration. Additionally, in some embodiments, users can stream data to analytics or data science platforms for immediate insights.

Figure 2:
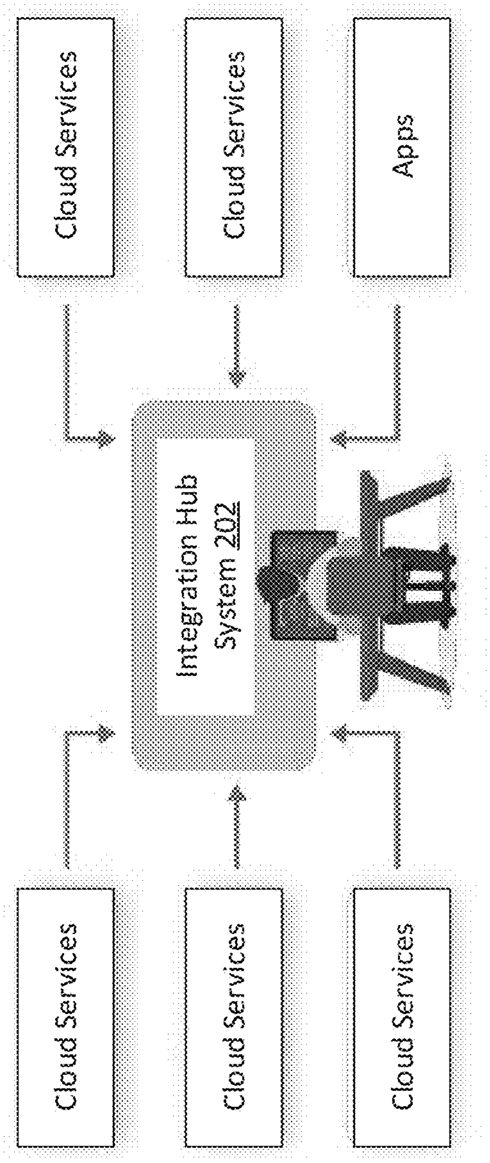
FIG. 2 depicts an environment for an integration hub system.

FIG. 2 depicts an environment for an integration hub system 202. The integration hub system 202 may connect various data sources and downstream consumers. In some embodiments, the integration hub system 202 comes with over 1,000 connectors to build data pipelines right. The integration hub system 202 may include an intuitive drag-and-drop graphical interface to create simple replication pipelines for complex data extraction and transformation tasks. With pre-built community recipes for common use cases, users can set up integration workflows in just a few clicks.

Along with the built-in data loader, event streaming capabilities, data APIs, and partner connectors, the integration hub system 202 enables rapid links to user systems using the platform 102. The integration hub system 202 may enable users to build automated workflows to get data to and from the platform 102 with any number of SaaS applications in just hours or days. Faster integration enables faster access to unified, trusted data to drive real-time business operations.

Figure 3:
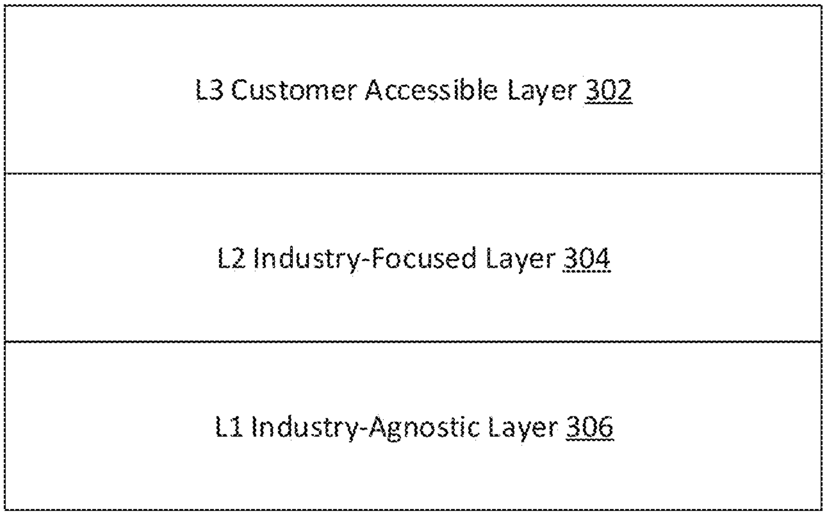
FIG. 3 depicts a three-layer model in some embodiments.

FIG. 3 depicts a three-layer model in some embodiments. Of the three layers, only layer 3 (e.g., the top layer of the n-layer model) 302, known as the "L3" is accessible by the customer. It is the layer that is a part of a tenant. The information associated with the L3 layer 302 may be retrieved from the tenant, edited. and applied back to the tenant using Configuration API.

The L3 302 layer typically inherits from the L2 layer 304 (an industry-focused layer) which in turn inherits from the L1 layer 306 (An industry-agnostic layer). Usually, the L3 layer 302 refers to an L2 304 container and inherits all data items (or "objects") from the L2 304 container. However, it is not required that the L3 302 refer to the L2 304 container, it can standalone.

The L2 layer 304 may inherit the objects from the L1 layer. Whereas there is only a single L1 306 set of objects, the objects at the L2 layer 304 may be grouped into industry-specific containers. Like the L1 layer 306, the containers at the L2 layer 304 may be controlled by product management and may not be accessible by customers.

Life sciences is a good example of an L2 layer 304 container. The L2 layer 304 container 304 may inherit the Organization entity type (discussed further herein) from L1 layer 306 and extends it to the Health Care Organization (HCO) type needed in life sciences. As such, the HCO type enjoys all of the attribution and other properties of the Organization type, but defines additional attributes and properties needed by an HCO.

The L1 layer 306 may contain entities such as Party (an abstract type) and Location. In some embodiments, the L1 layer 306 contains a fundamental relationship type called HasAddress that links the Party type to the Location type. The L1 layer 306 also extends the Party type to Organization and Individual (both are non-abstract types).

There may be only one L1 layer 306, and its role is to define industry-agnostic objects that can be inherited and utilized by industry specific layers that sit at the L2 layer 304. This enables enhancement of the objects in the L1 layer 306, potentially affecting all customers. For example, if an additional attribute were added into the HasAddress relationship type, it typically would be available for immediate use by any customer of the platform.

Any object can be defined in any layer. It is the consolidated configuration resulting from the inheritance between the three layers that is commonly referred to as the tenant configuration or metadata configuration. In a specific implementation, metadata configuration consolidates simple, nested, and reference attributes from all the related layers. Values described in the higher layer overrides the values from the lower layers. The number of layers does not affect the inheritance.

In a specific implementation, metadata configuration consolidates simple, nested, and reference attributes from all the related layers. Values described in the higher layer overrides the values from the lower layers. The number of layers does not affect the inheritance.

Figure 4:
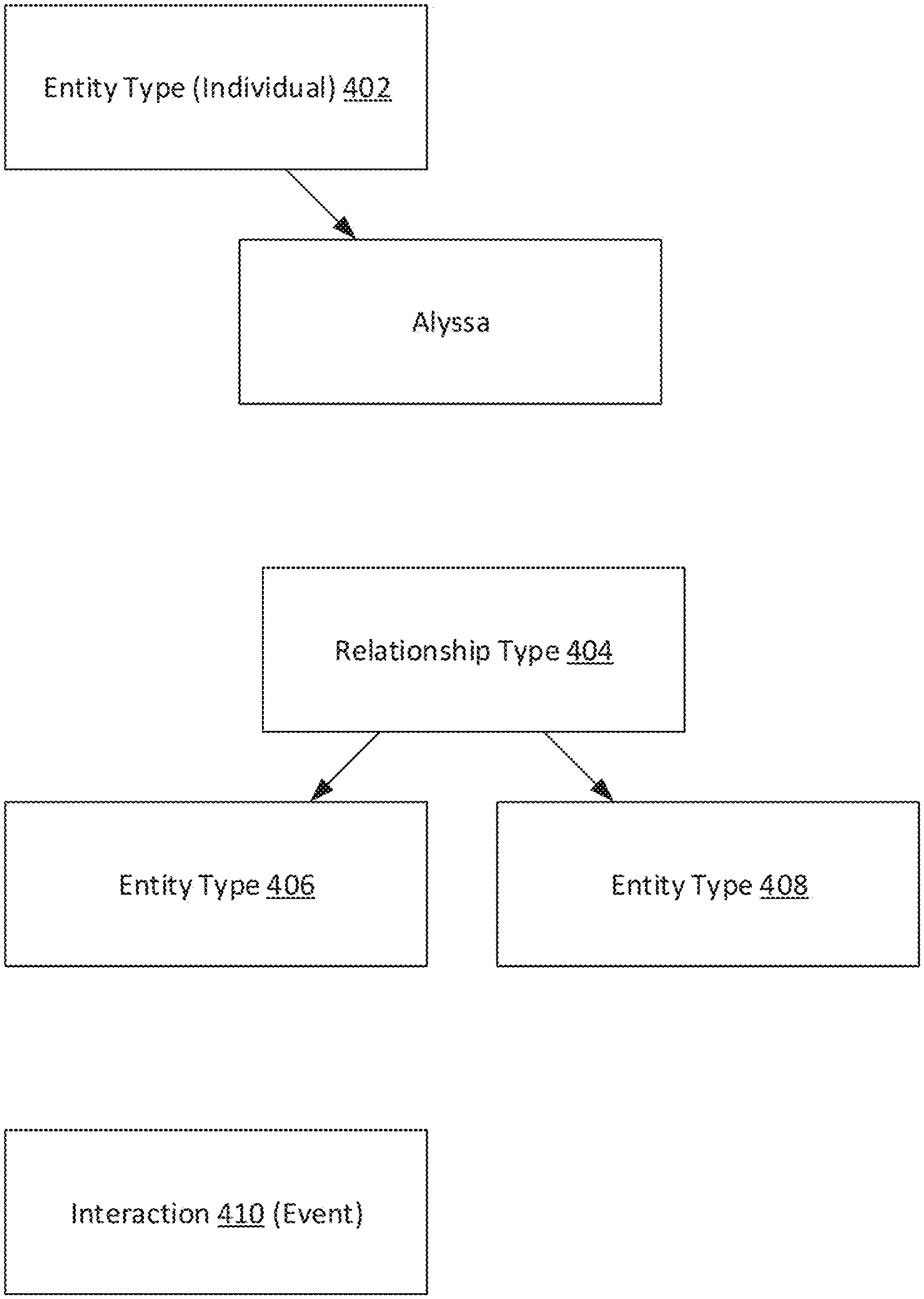
FIG. 4 is a box diagram of some examples of entity type, relationship type and event metadata.

FIG. 4 is a box diagram of some examples of entity type, relationship type and event metadata. The platform 102 enables object types entities, relationships, and interactions. The entity type 402 may be a class of entity. For example, "Individual" is an entity type 402, and "Alyssa" represents a specific instance of that entity type. Other common examples of entity types include "Organization," "Location," and "Product."

Often, entity types can materialize in single instances, such as the "Alyssa" example above. In another example, the L1 layer may define the abstract "Party" entity type with a small collection of attributes. The L1 layer may then be configured to define the "Individual" entity type and the "Organization" entity type, both of which inherit from "Party," both of which are non-abstract and both of which add additional attributes specific to their type and business function. Continuing with the concept of inheritance, in the L2 Life Sciences container, the HCP entity may be defined (to represent physicians) which inherits from the "Individual" type but also defines a small collection of attributes unique to the HCP concept. Thus, there is an entity taxonomy "Party," "Individual," or "HCP," and the resulting HCP entity type provides the developer and user with the aggregate attribution of "Party," "Individual," and "HCP."

Once the entity types are defined, the user can link entities together in a data model by using the relationship type. Once the user defines entity types, they can be linked by defining relationships between them. For example, a user can post a relationship independently to link two entities together, or the client can mention a relationship in a JSON, which then posts the relationship and the two entities all at once.

A relationship type 404 describes the links or connections between two specific entities (e.g., entities 406 and 408). A relationship type 404 and the entities 406 and 408 described together form a graph. Some common relationship types are Organization to Organization, Subsidiary Of, Partner Of, Individual to Individual, Parent of/Child Of, Reports To, Individual to Organization/Organization to Individual, Affiliated With, Employee Of/Contractor Of.

Once the user defines entity types, they can be linked by defining relationships between them. For example, a user can post a relationship independently to link two entities together, or the client can mention a relationship in a JSON, which then posts the relationship and the two entities all at once.

The platform 102 may enable the user to define metadata properties and attributes for relationship types. The user can define up to any number metadata properties. The user can also define several attributes for a relationship type, such as name, description, direction (undirected, directed, bi-directional), start and end entities, and more. Attributes of one relationship type can inherit attributes from other relationship types.

Hierarchies may be defined through the definition of relationship subtypes. For example, if a user defines "Family" as a relationship type, the user can define "Parent" as a subtype. One hierarchy contains one or many relationship types; all the entities connected by these relationships form a hierarchy. Entity A>HasChild (Entity B)>HasChild (Entity C). Then A, B, and C form a hierarchy. In the same hierarchy, the user can add Subsidiary as a relationship and if Entity D is subsidiary of Entity C, then A, B, C, and D all become part of a single hierarchy.

Interactions 410 are lightweight objects that represent any kind of interaction or transaction. As a broad term, interaction 410 stands for an event that occurs at a particular moment such as a retail purchase or a measurement. It can also represent a fact in a period of time such as a sales figure for the month of June.

Interactions 410 may have multiple actors (entities), and can have varying record lengths, columns, and formats. The data model may be defined using attribute types. As a result, the user can build a logical data model rather than relying on physical tables and foreign keys; define entities, relationships, and interactions in granular detail; make detailed data available to content and interaction designers; provide business users with rich, yet streamlined, search and navigation experiences.

In various embodiments, four manifestations of the attribute type include Simple, Nested, Reference, and Analytic. The simple attribute type represents a single characteristic of an entity, relationship, or interaction. The nested, reference and analytic attribute types represent combinations or collections of simple sub-attribute types.

The nested attribute type is used to create collections of simple attributes. For example, a phone number is a nested attribute. The sub-attributes of a phone number typically include Number, Type, Area code, Extension. In the example of a phone number, the sub-attributes are only meaningful when held together as a collection. When posted as a nested attribute, the entire collection represents a single instance, or value, of the nested attribute. Posts of additional collections are also valid and serve to accumulate additional nested attributes within the entity, relationship or interaction data type.

The reference attribute type facilitates easy definition of relationships between entity types in a data model.

A user may utilize the reference attribute type when they need one entity to make use of the attributes of another entity without natively defining the attributes of both. For example, the L1 layer in the information model defines a relationship that links an Organization and an Individual using the affiliatedwith relationship type. The affiliatedwith relationship type defines the Organization entity type to be a reference attribute of the Individual entity type. This approach to data modeling enables easier navigation between entities and easier refined search.

Easier navigation between entities: In the example of the Organization and Individual entities that are related using the affiliatedwith relationship type, specifying an attribute of previous employer for the Individual entity type enables this attribute to be presented as a hyperlink on the individual's profile facet. From there, the user can navigate easily to the individual's previous employer.

Easily refined search: When attributes of a referenced entity and relationship type are available to be indexed as though they were native to the referencing entity, business users can more easily refine search queries. For example, in a search of a data set that contains 100 John Smith records, entering John Smith in the search box will return 100 John Smith records. Adding Acme to the search criteria will return only those records with John Smith that have a reference, and thus an attribute, that contains the word Acme.

The analytic attribute type is lightweight. In various embodiments, it is not managed in the same way that other attributes are managed when records come together during a merge operation. The analytic attribute type may be used to receive and hold values delivered by an analytics solution.

The user may utilize the analytic attribute type when they want to make a value from your analytics solution, such as Reltio Insights, available to a business user or to other applications using the Reltio Rest API. For example, if an analytics implementation calculates a customer's lifetime value and the user needs that value to be available to the user while they are looking at the customer's profile, the user may define an analytic attribute to hold this value and provide instructions to deliver the result of the calculation to this attribute.

In a specific implementation, the platform 102 assigns entity IDs (EIDs) to each item of data that enters the platform. As such, the platform can appropriately be characterized as including an EID assignment engine. Importantly, a lineage-persistent relational database management system (RDBMS) retains the EIDs for each piece of data, even if the data is merged and/or assigned a new EID. As such, the platform can appropriately be characterized as including a legacy EID retention engine, which has the task of ensuring when new EIDs are assigned, legacy EIDs are retained in a legacy EID datastore. The legacy EID retention engine can at least conceptually be divided into a legacy EID survivorship subengine responsible for retaining all EIDs that are not promoted to primary EID as legacy EIDs and a lineage EID promotion subengine responsible for promoting an EID of a first data item merged with a second data item to primary EID of the merged data item. An engine responsible for changing data items, including merging and unmerging (previously merged) data items can be characterized as a data item update engine. Cross-tenant durability also becomes possible when legacy EIDs are retained. In a specific implementation, a cross-tenant durable EID lineage-persistent RDBMS has an n-Layer architecture, such as a 3-Layer architecture.

Data may come from multiple sources. The process of receiving data items can be referred to as "onboarding" and, as such, the platform 102 can be characterized as including a new dataset onboarding engine. Each data source is registered and, in a specific implementation, all data that is ultimately loaded into a tenant will be associated with a data source. If no source is specified when creating a data item (or "object"), the source may have a default value. As such, the platform can be characterized as including an object registration engine that registers data items in association with their source.

A crosswalk can represent a data provider or a non-data provider. Data providers supply attribute values for an object and the attributes are associated with the crosswalk. Non-data providers are associated with an overall entity (or relationship); it may be used to link an L1 (or L2) object with an object in another system. Crosswalks do not necessarily just apply to the entity level; each supplied attribute can be associated with data provider crosswalks. Crosswalks are analogous to the Primary Key or Unique Identifier in the RDBMS industry.

The engines and datastores of the platform 102 can be connected using a computer-readable medium (CRM). A CRM is intended to represent a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g., "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented as cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations, while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

Matching is a powerful area of functionality and can be leveraged in various ways to support different needs. The classic scenario is that of matching and merging entities (Profiles). Within the architecture discussed herein, relationships that link entities can also and often do match and merge into a single relationship. This may occur automatically and is discussed herein.

Matching can be used on profiles within a tenant to deduplicate them. It can be used externally from the tenant on records in a file to identify records within that file that match to profiles within a tenant. Matching may also be used to match profiles stored within a Data Tenant to those within a tenant.

Figure 5:
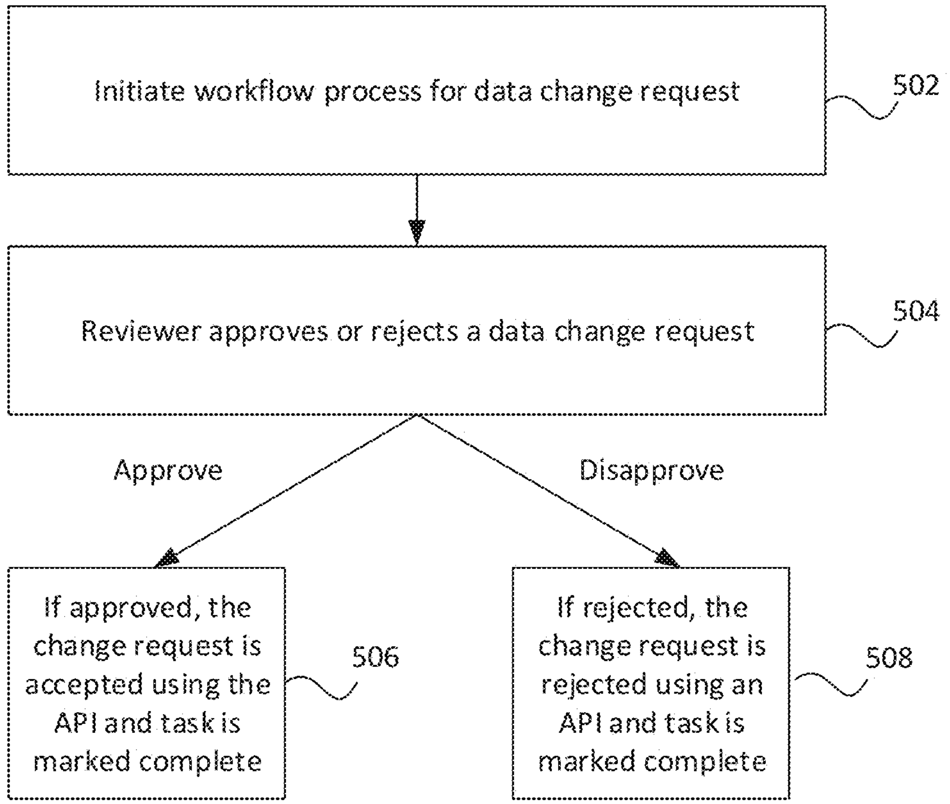
FIG. 5 depicts a dynamic matching facilitation flowchart.

FIG. 5 depicts a dynamic matching facilitation flowchart. The match architecture is responsible for identifying profiles within the tenant that are considered to be semantically the same or similar. A user may establish a match scheme using the match configuration framework. In some embodiments, the user may utilize machine learning techniques to match profiles. In step 502, the user may create match rules. In step 504, the user may identify the attributes from entity types they wish to use for matching. In step 506, the user may write a comparison formula within each match rule which is responsible for doing the actual work of comparing one profile to another. In step 508, the user may map token generator classes that will be responsible for creating match candidates.

Unlike other systems, in various embodiments, the architecture is designed to operate in real-time. Prior to the match process and merge processes occurring, every profile created or updated is may be cleansed on-the-fly by the profile-level cleansers. Thus the 3-step sequence of cleanse, match, merge may be designed to all occur in real-time anytime a profile is created or updated. This behavior makes the platform 102 ideal for real-time operational use within a customer's ecosystem.

Lastly, the survivorship architecture is responsible for creating the classic "golden record", but in a specific implementation, it is a view, materialized on-the-fly. It is returned to any API call fetching the profile and contains a set of "Operational Values" from the profile, which are selected in real-time based on survivorship rules defined for the entity type.

In various embodiments, matching may operate continuously and in real-time. For example, when a user creates or updates a record in the tenant, the platform cleanses and processes the record to find matches within the existing set of records.

Each entity type (e.g., contact, organization, product) may have its own set of match groups. In some embodiments, each match group holds a single rule along with other properties that dictate the behavior of the rule within that group. Comparison Operators (e.g., Exact, ExactOrNull, and Fuzzy) and attributes may comprise a single rule.

Match tokens may be utilized to help the match engine quickly find candidate match values. A comparison formula within a match rule may be used to adjudicate a candidate match pair and will evaluate to true or false (or a score if matching is based on relevance).

In some embodiments, the matching function may do one of three things with a pair of records: Nothing (if the comparison formula determines that there is no match); Issue a directive to merge the pair; Issue a directive to queue the pair for review by a data steward. In some embodiments, the architecture may include the following:

1) Entities and relationships each have configurable attribution capability.

2) Values found in an attribute are associated with a crosswalk held within an entity or relationship object. Each profile can have multiple crosswalks, each contributing one or more values. Data may come from multiple sources. Each source may be registered, and all data loaded into a tenant will be associated with a data source. Each supplied attribute may be associated with data provider crosswalks. Crosswalks are analogous to the Primary Key or Unique Identifier in relational database management system (RDBMS). A crosswalk can represent a data provider or a non-data provider.

3) Data providers supply attribute values for an object and the attributes are associated with the crosswalk.

4) Non-data providers are associated with an overall entity (or relationship). In this case it is simply used to link a Reltio object with an object in another system. Supplied attributes may NOT be associated with this crosswalk.

5) Profiles can be matched and merged, but relationships are also matched and merged. While the user may develop match rules to govern the matching and merging of profiles, merging of relationships is automatic and intrinsic to the platform. Any two relationships of the same type, that each have entity A at one endpoint and entity B at their other endpoint, will merge automatically.

6) An attribute is intrinsically multi-valued, meaning it can hold multiple values. This means any attribute can collect and store multiple values from contributing sources or through merging of additional crosswalks. Thus, if a match rule utilizes the first name attribute, then the match engine will by default, compare all values held within the first name attribute of record A to all values held within the first name attribute of record B, looking for matches among the values. The user may elect to only match on operational values if desired.

7) When two profiles merge, the resulting profile contains the aggregate of all the crosswalks of the two contributing profiles and thus the associated attributes and values from those crosswalks. The arrays behind the attributes naturally merge as well, producing for each attribute an array that holds the aggregation of all the values from the contributing attributes. Relationships benefit from the same architecture and behave in the same manner as described for merged entities. The surviving entity ID (or relationship ID) for the merged profile (or relationship) is that of the oldest of the two contributors. Other than that, there really isn't a concept of a winner object and a loser object.

8) When two profiles merge the resulting profile contains references to all the interactions that were previously associated with the contributing profiles. (Note that Interactions do not reference relationships.)

9) If profile B is unmerged from the previous merge of A and B, then B will be reinstated with its original entity ID. All of the attributes (and associated values), relationships, and interactions profile B brought into the merged profile will be removed from the merged profile and returned to profile B.

The matchGroups construct is a collection of match groups with rules and operators that are needed for proper matching. If the user needs to enable matching for a specific entity type in a tenant, then the user may include the matchGroups section within the definition of the entity type in the metadata configuration of the tenant. The matchGroups section will contain one or more match groups, each containing a single rule and other elements that support the rule.

Looking at a match group in a JSON editor, the user can easily see the high-level, classic elements within it. The rule may define a Boolean formula (see the and operator that anchors the Boolean formula in this example) for evaluating the similarity of a pair of profiles given to the match group for evaluation. It is also within the rule element that four other very common elements may be held: ignoreInToken (optional), Cleanse (optional), matchTokenClasses (required), and comparatorClasses (required). The remaining elements that are visible (URI, label, and so on), and some not shown in the snapshot, surround the rule and provide additional declarations that affect the behavior of the group and in essence, the rule.

Each match group may be designated to be one of four types: automatic, suspect, <custom>, and relevance_based described below. The type the user selects may govern whether the user develops a Boolean expression for the comparison rule or an arithmetic expression. The types are described below.

Behavior of the automatic type: With this setting for type, the comparison formula is purely Boolean and if it evaluates to TRUE, the match group will issue a directive of merge which, unless overridden through precedence, will cause the candidate pair to merge.

Behavior of the suspect type: With this setting for type, the comparison formula is purely Boolean and if it evaluates to TRUE, the match group will issue a directive of queue for review which, unless overridden through precedence, will cause the candidate pair to appear in the "Potential Matches View" of the MDM UI.

Behavior of the relevance_based type: Unlike the preceding rules, all of which are based on a Boolean construction of the rule formula, the relevance-based type expects the user to define an arithmetic scoring algorithm. The range of the match score determines whether to merge records automatically or create potential matches.

If a negativeRule exists in the matchGroups and it evaluates to true, any merge directives from the other rules are demoted to queue for review. Thus, in that circumstance, no automatic merges will occur. The Scope parameter of a match group defines whether the rule should be used for Internal Matching or External Matching or both. External matching occurs in a non-invasive manner and the results of the match job are written to an output file for the user to review. Values for Scope are: ALL-Match group is enabled for internal and external matching (Default setting). NONE—Matching is disabled for the match group. INTERNAL—Match group is enabled for matching records within the tenant only. EXTERNAL—Match group is enabled only for matching of records from an external file to records within the tenant; in a specific implementation, external matching is supported programmatically via an External Match API and available through an External Match Application found within a console, such as a RELTIO® Console.

If set to true, then only the OV of each attribute will be used for tokenization and for comparisons. For example, if the First Name attribute contains "Bill", "William", "Billy", but "William" is the OV, then only "William" will be considered by the cleanse, token, and comparator classes.

The rule is the primary component within the match group. It contains the following key elements each described in detail: ignoreInToken, Cleanse, matchTokenClasses, comparatorClasses, Comparison formula.

A negative rule allows a user to prevent any other rule from merging records. A match group can have a rule or a negative rule. The negative rule has the same architecture as a rule but has the special behavior that if it evaluates to true, it will demote any directive of merge coming from another match group to queue for review. To be sure, most match groups across most customers' configurations use a rule for most matching goals. But in some situations, it can be advantageous to additionally dedicate one or more match groups to supporting a negative rule for the purpose of stopping a merge based on usually a single condition. And when the condition is met, the negative rule prevents any other rule from merging the records. So in practice, the user might have seven match groups each of which use a rule, while the eighth group uses a negative rule.

The platform 102 may include a mechanism to proactively monitor match rules in tenants across all environments. In some embodiments, after data is loaded into the tenant, the proactive monitoring system inspects every rule in the tenant over a period of time and the findings are recorded. Based on the percentage of entities failing the inspections, the proactive monitoring system detects and bypasses match rules that might cause performance issues and the client may be will be notified. The bypassed match rules will not participate in the matching process.

In various embodiments, the user receives a notification when the proactive monitoring system detects a match rule that needs review. ScoreStandalone and ScoreIncremental elements may be used to calculate a Match Score for a profile that is designated as a potential match and can assist a data steward when reviewing potential matches.

Relevance-based matching is designed primarily as a replacement of the strategy that uses automatic and suspect rule types. With Relevance-based matching, the client may create a scoring algorithm of the user's own design. The advantage is that in most cases, a strategy based on Relevance-based matching can reduce the complexity and overall number of rules. The reason for this is that the two directives of merge and queue for review which normally require separate rules (automatic and suspect respectively) can often be represented by a single Relevance-Based rule.

A workflow is a series of sequential steps or tasks that are carried out based on user-defined rules or conditions to execute a business process. The Workflow may allow a user to manage complex business processes through a series of predetermined steps or tasks. The platform 102 may utilize the workflow to enable processes and tasks management, including the assignment and tracking of the tasks. A workflow process may support a creator, a create date, a due date, an assignee, steps, and comments. In various embodiments, workflow business processes are configurable. In some embodiments, the various actors and triggers in a workflow are Actors: The people and processes that participate in the workflow are the actors, e.g., Reviewer, Workflow Engine, Hub, and API; Reviewer: The user will be assigned with the role ROLE_REVIEWER; Trigger: It is a scheduled process that scans activity logs to initiate a review workflow, e.g., from the UI, you can start a Data Change Request workflow to review the updates or the changes to the entities or the profiles data in your tenant. The workflow feature may allow a user to manage business processes through a series of predetermined steps or tasks which enables you to plan and coordinate user tasks, validations, reviews, and approvals for multiple records.

Data Change Request (DCR) is a collection of suggested data changes. Users who do not have rights to update objects, such as the customer sales representatives, can suggest changes. These suggested changes will be accumulated in Data Change Requests queued for review and approval by people with approval privileges, such as the data stewards. Examples of suggested data changes include adding a new attribute value, updating an attribute value, deleting an attribute value, and creating a new object along with referenced objects. Data Change Requests can be initiated using web browser-based user interface for Desktop or Mobile. An example of a step can be a user task assigned to users for Review and Approval of the data change request. In this example, a Workflow for a Data Change Request (DCR) includes the following sequence of steps in the flowchart of FIG. 5.

In step 502, on the profile page in Hub, users can initiate the DCR workflow process in the Suggesting mode.

In step 504, the Reviewer can Approve or Reject the DCR. In the Data Change Request Review pane of the UI, sub-attributes within the nested, reference, or complex attributes, and parent-nested attributes, have a label of the attribute value.

In step 506, if the Reviewer approves the DCR, the change request is accepted using the API and the task is marked complete.

In alternative step 508, if the Reviewer rejects the DCR, the change request is rejected using the API and the task is marked complete. In the Inbox, you have the option of partially rejecting changes from a DCR. In various embodiments, a reviewer may selectively reject attributes and approve a DCR partially.

Figure 6:
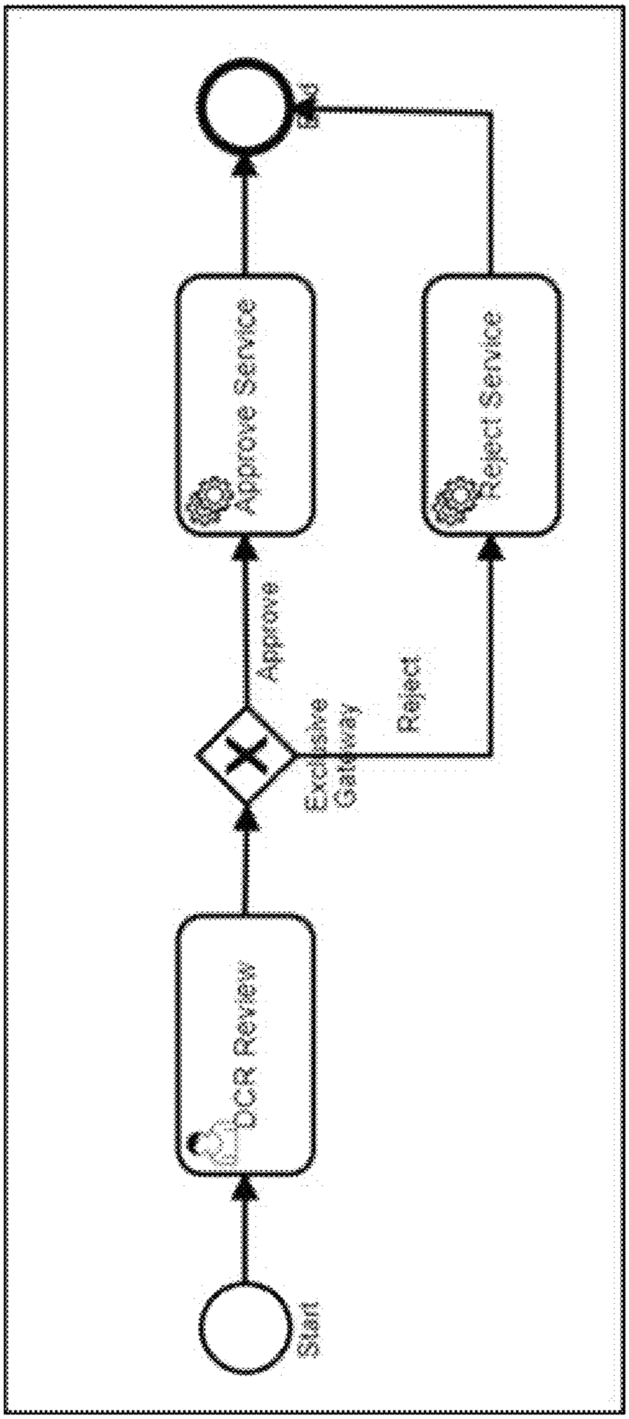
FIG. 6 depicts a graphical diagram of the data change request (DCR) workflow review process of FIG. 5.

FIG. 6 depicts a graphical diagram of the data change request (DCR) workflow review process of FIG. 5.

From a business user's perspective, a workflow may be initiated (manually or automatically) for one or multiple profiles. As a user assigned to the task, the approver can either review the proposed changes or enter a comment.

Figure 8:
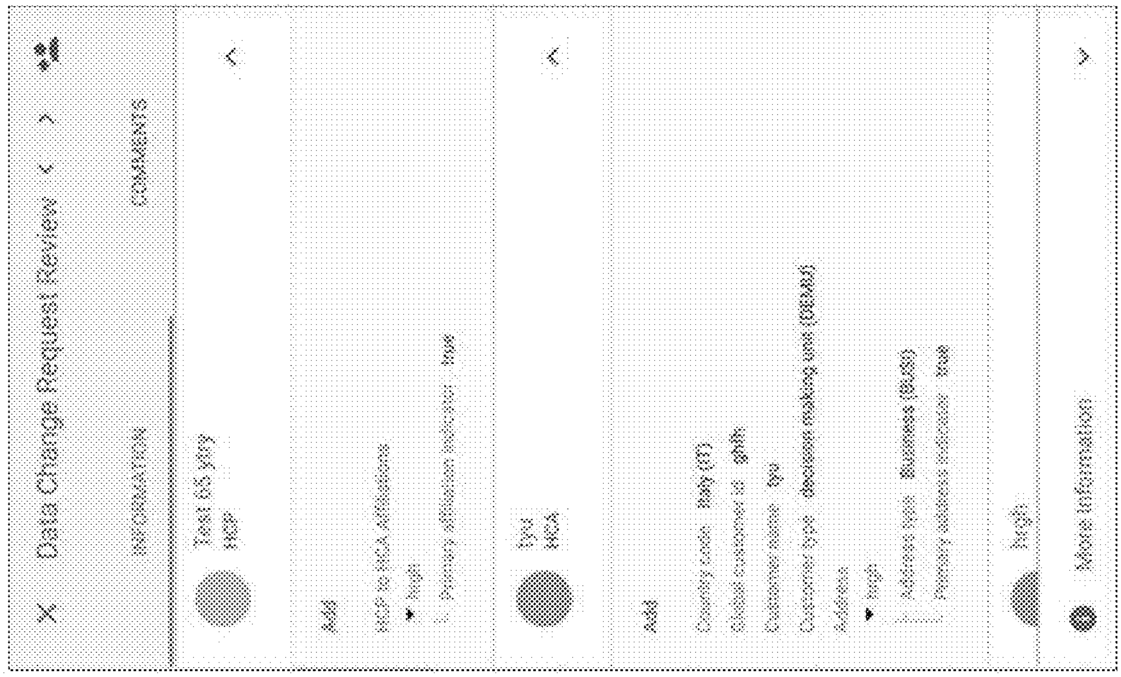
FIGS. 7 and 8 are examples of data change request review panes for a user interface (UI).
Figure 7:
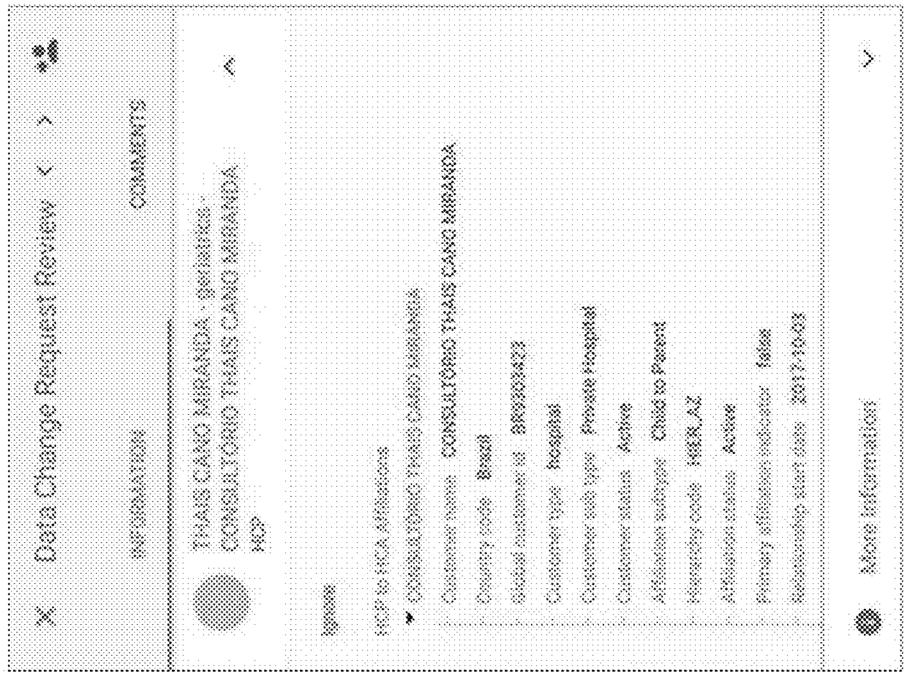

FIG. 7 is an example data change request review pane for the UI in some embodiments. FIG. 8 is another example data change request review pane for the UI in some embodiments. In the example Data Change Request Review pane, sub-attributes within the nested, reference, or complex attributes, and parent-nested attributes, have a label of the attribute value, as shown in these examples.

Figure 9:
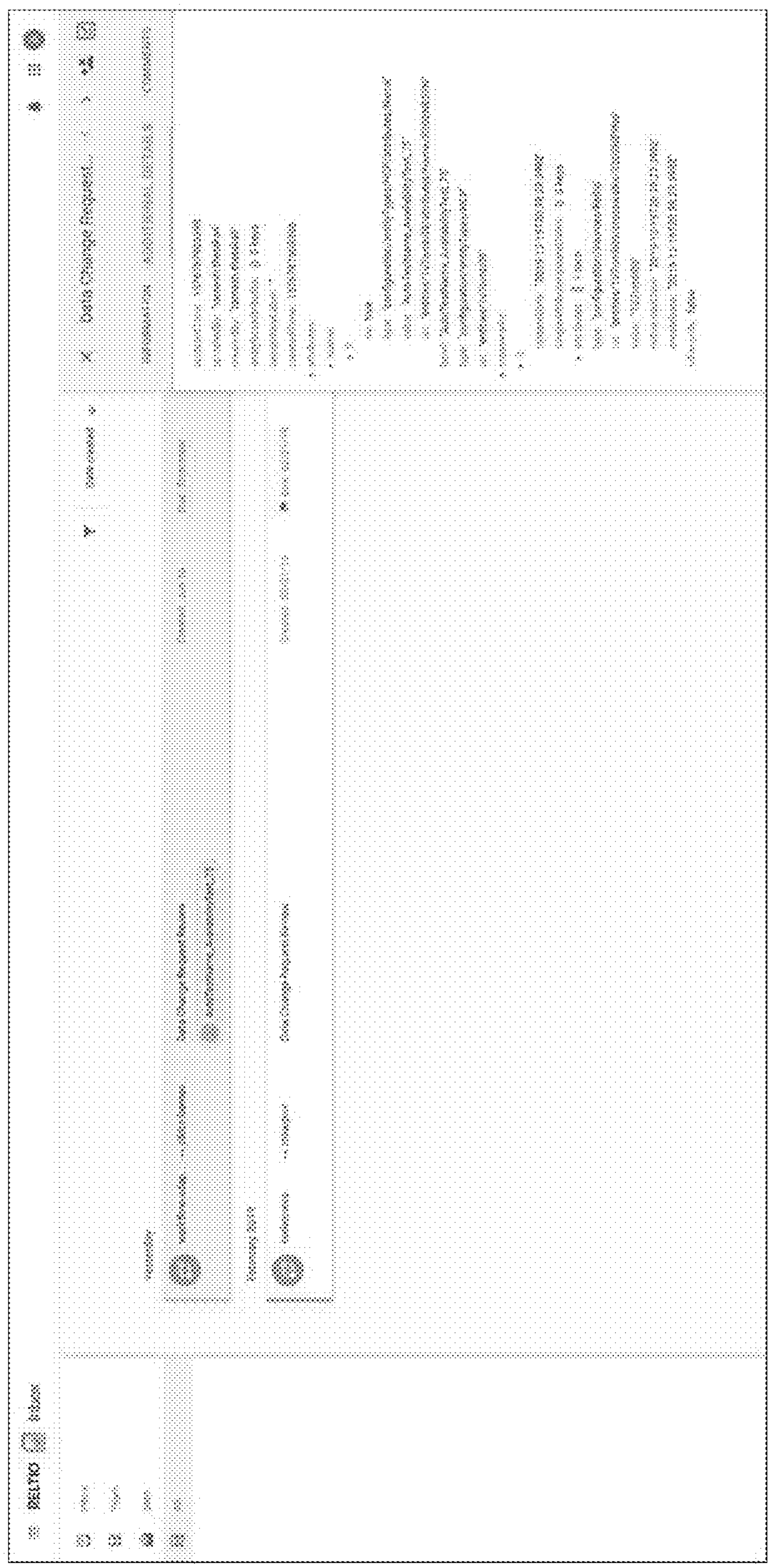
FIG. 9 depicts an additional details tab in the data change request review pane.

To ensure that data stewards can make an informed decision about approving or rejecting a DCR, the ADDITIONAL DETAILS tab is available in the Data Change Request Review panel. FIG. 9 depicts an additional details tab in the data change request review panel in some embodiments. The ADDITIONAL DETAILS tab shows external information of a DCR related to an active task stored by the users. This can be any information that can help the data stewards during the approval process. This external information may be available in the JSON format.

Partial reject may be automatically enabled for users who have the DELETE permission on the MDM: data.changeRequests role. Out-of-the-box workflow processes work with system role ROLE_REVIEWER, which does not have this permission. Therefore, existing customers may have this feature enabled automatically depending on permissions they have assigned to data stewards (workflow reviewers). Otherwise, customers must enable partial reject by using the User Management console application.

Figure 10:
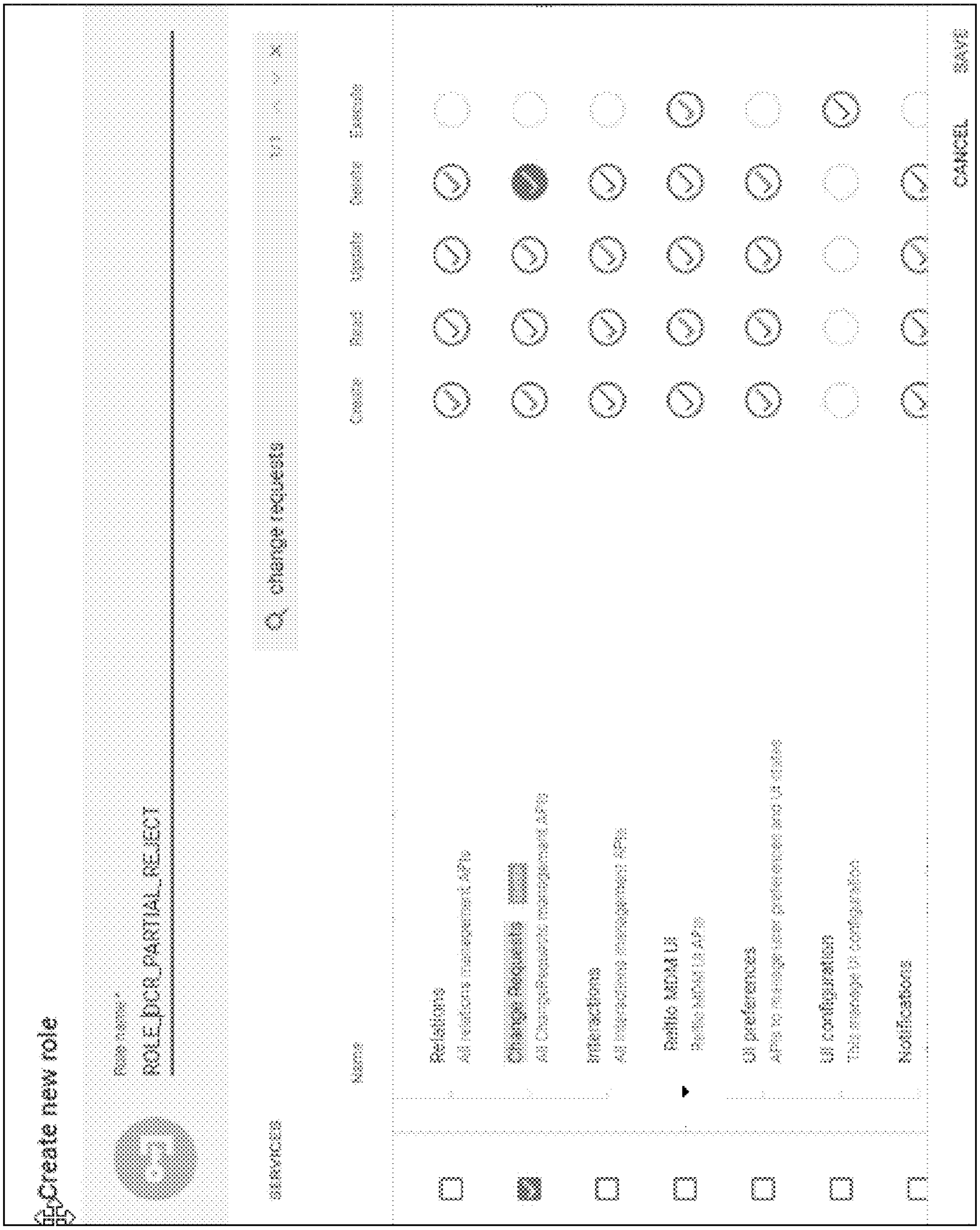
FIG. 10 depicts an interface to create a new role.

FIG. 10 depicts an interface to create a new role in some embodiments. In this example of FIG. 10, a new role is created with exact permissions (delete).

Figure 11:
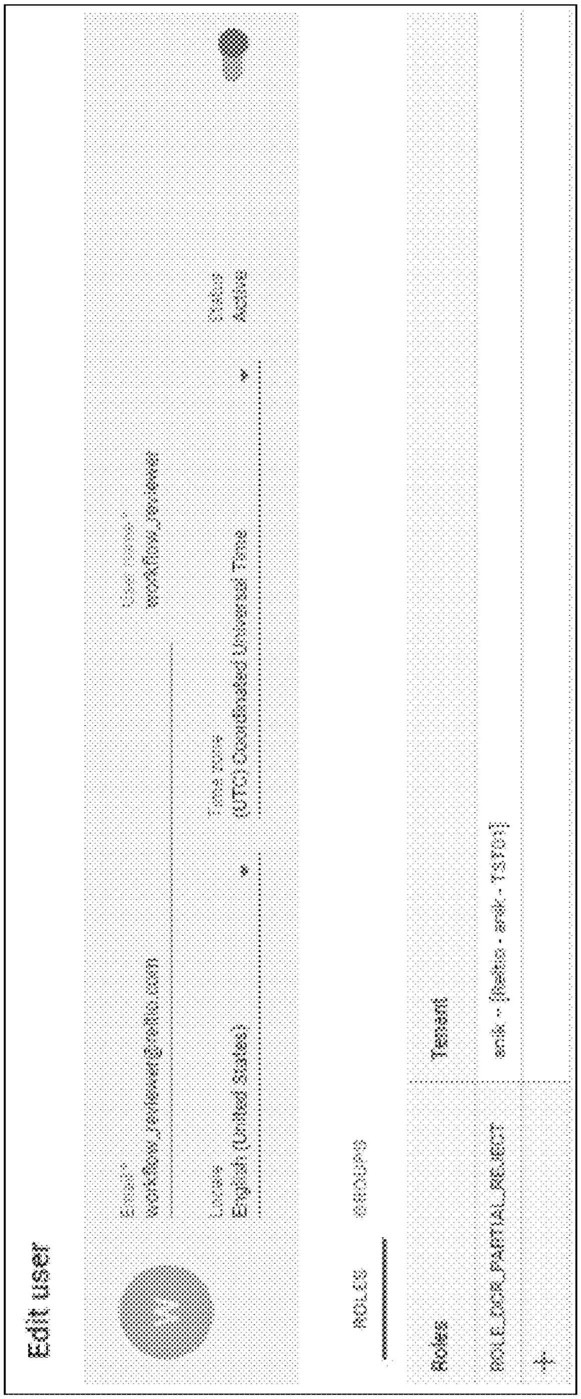
FIG. 11 depicts an interface to edit a user.

FIG. 11 depicts an interface to edit a user. In this example of FIG. 11, the role is assigned to user/users/group of users on the relevant tenants. A user can partially reject the attributes in a Data Change Request for entities and relationships. This includes nested attributes and sub attributes of a nested attribute. In addition, you can reject the entire DCR that prevents the creation of the new entities or relationships.

Figure 12:
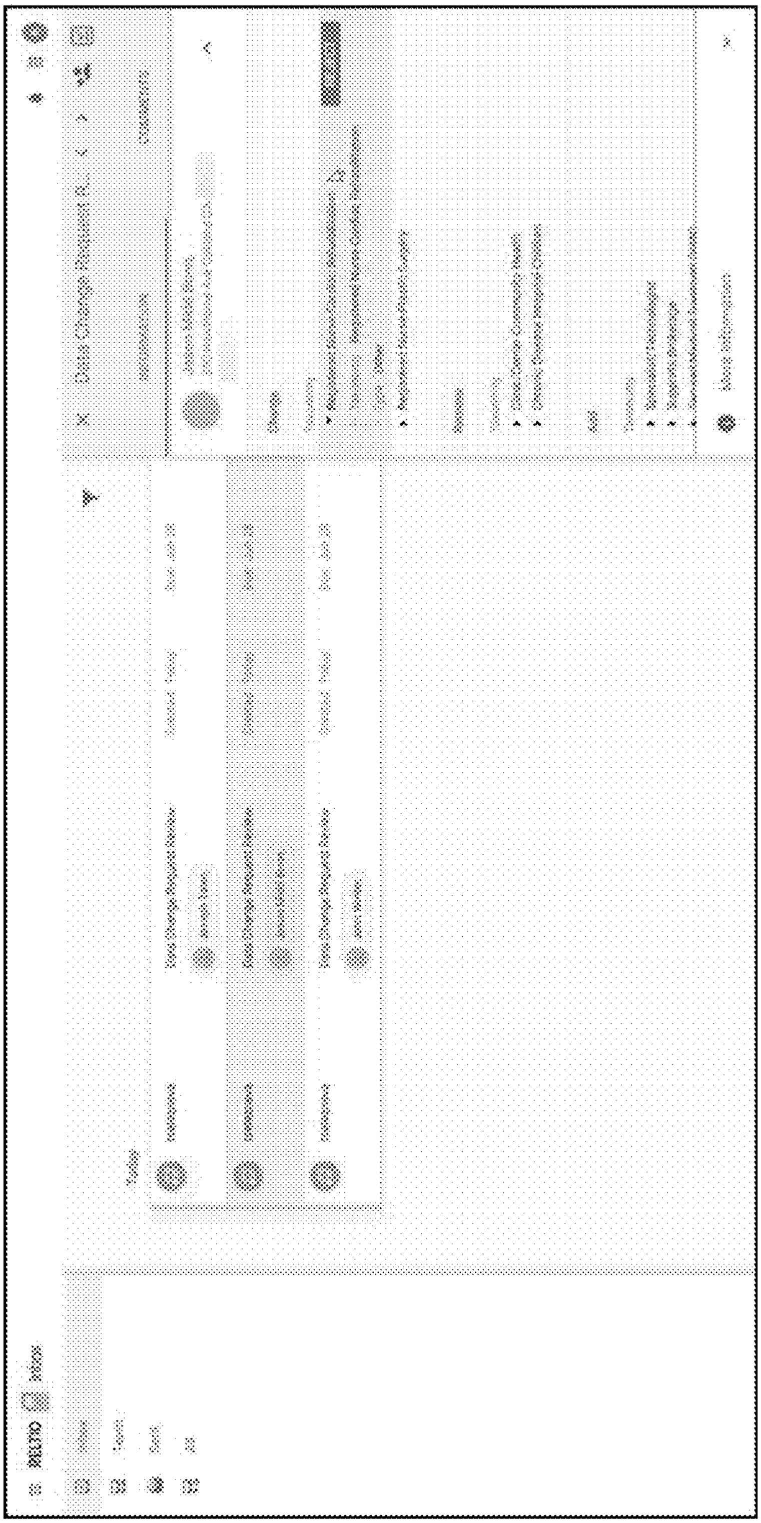
FIG. 12 depicts an interface for a data change request.

FIG. 12 depicts an interface for a data change request in some embodiments. In the interface depicted in FIG. 12, the user may select the task by clicking on the task in the Inbox tab and view the detailed information on the right panel. When you mouse over the change, the REJECT option may appear.

Figure 13:
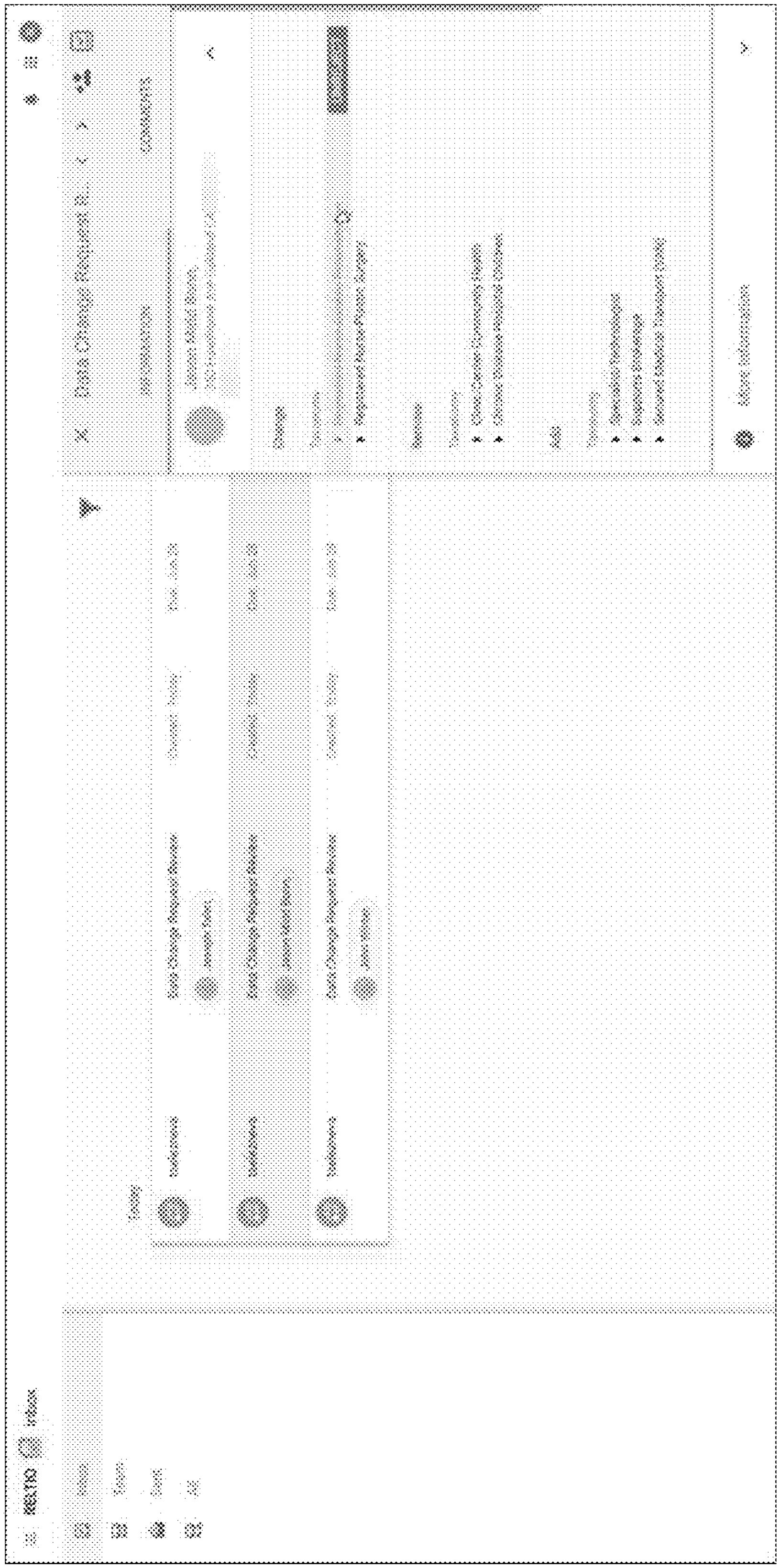
FIG. 13 depicts the interface for a data change request including an "unreject" option.

FIG. 13 depicts the interface for a data change request including an "unreject" option. The user may select the task by clicking on the task in the Inbox tab and view the detailed information on the right panel. When the user mouses over the change, the REJECT option appears.

In this example, the user may click the REJECT option corresponding to the change they want to reject. The rejected changes appear as struck out but are not deleted from the DCR until the task is approved. If the user moves to any other tab without approving the task, all rejections may be canceled. If the user chooses not to reject the change from the DCR, the user may click the UNREJECT button.

In some embodiments, reject does not work for start/end dates, roles, and tags for new entities/relationships. There may not be validation of dependencies for rejected new entities. If there is a reference attribute for this entity, it may continue to exist without changes.

In some embodiments, when changing a relationship, the old relationship is removed, and a new relationship is added. Hence, while rejecting the changes made to a relationship, both the actions remove and add may be rejected.

Figure 14:
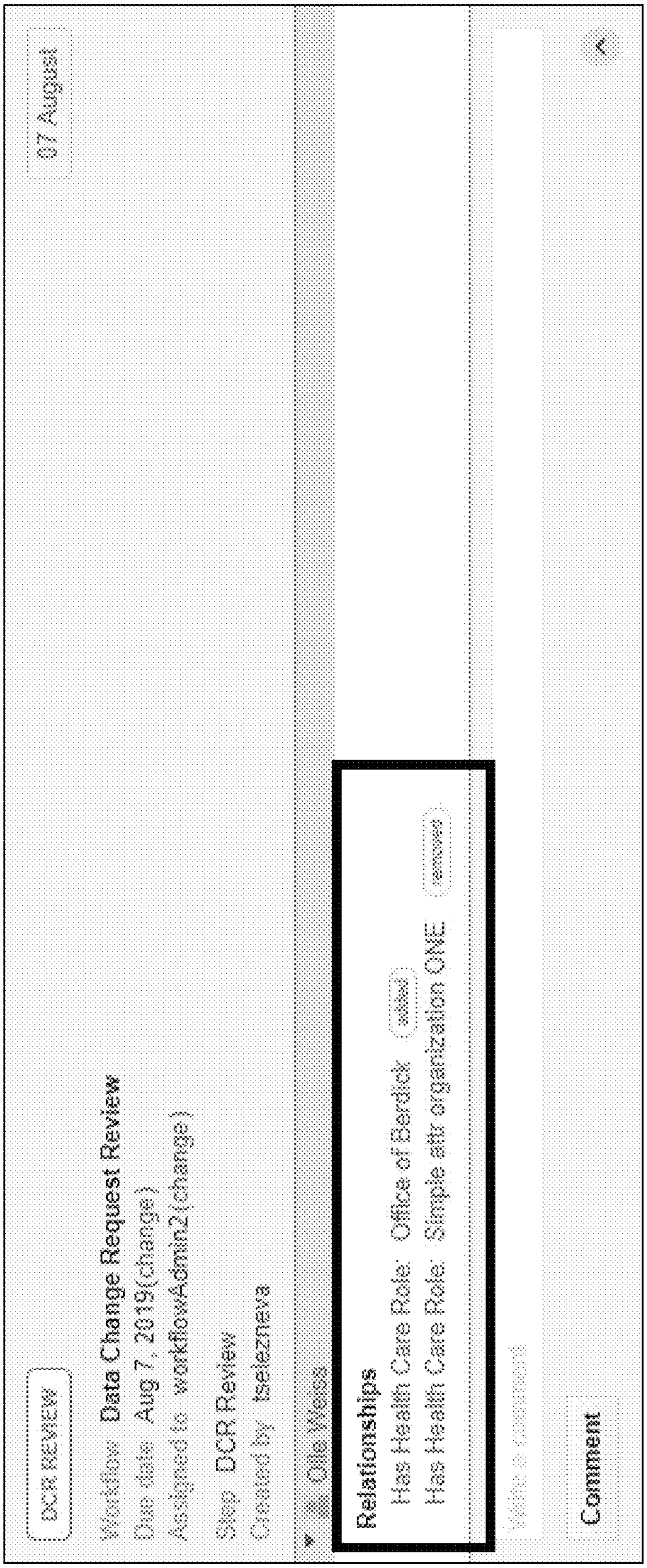
FIG. 14 depicts an interface for a data change request review depicting relationships status.

FIG. 14 depicts an interface for a data change request review depicting relationships status in some embodiments. If both the actions are not rejected, the following changes may take place: No relationships may exist if the added relationship is rejected and the removed relationship is applied; and Two relationships may exist if the added relationship is applied and the removed relationship is rejected.

Figure 15:
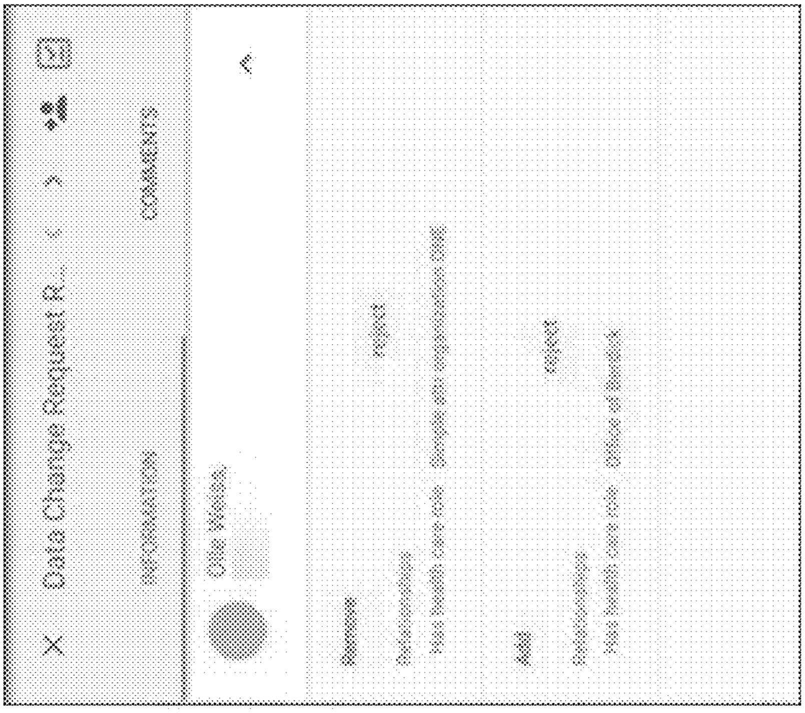
FIG. 15 depicts an interface for a data change request.

FIG. 15 depicts an interface for a data change request in some embodiments. Changes to relationships and their attributes, or new or deleted relationships, may be shown in the right-side panel as depicted in the interface of FIG. 16 in some embodiments.

If a new relationship has been added and attributes are provided, a caret icon may appear near the title of the relationship. Click the caret icon to see the added attributes.

Figure 16:
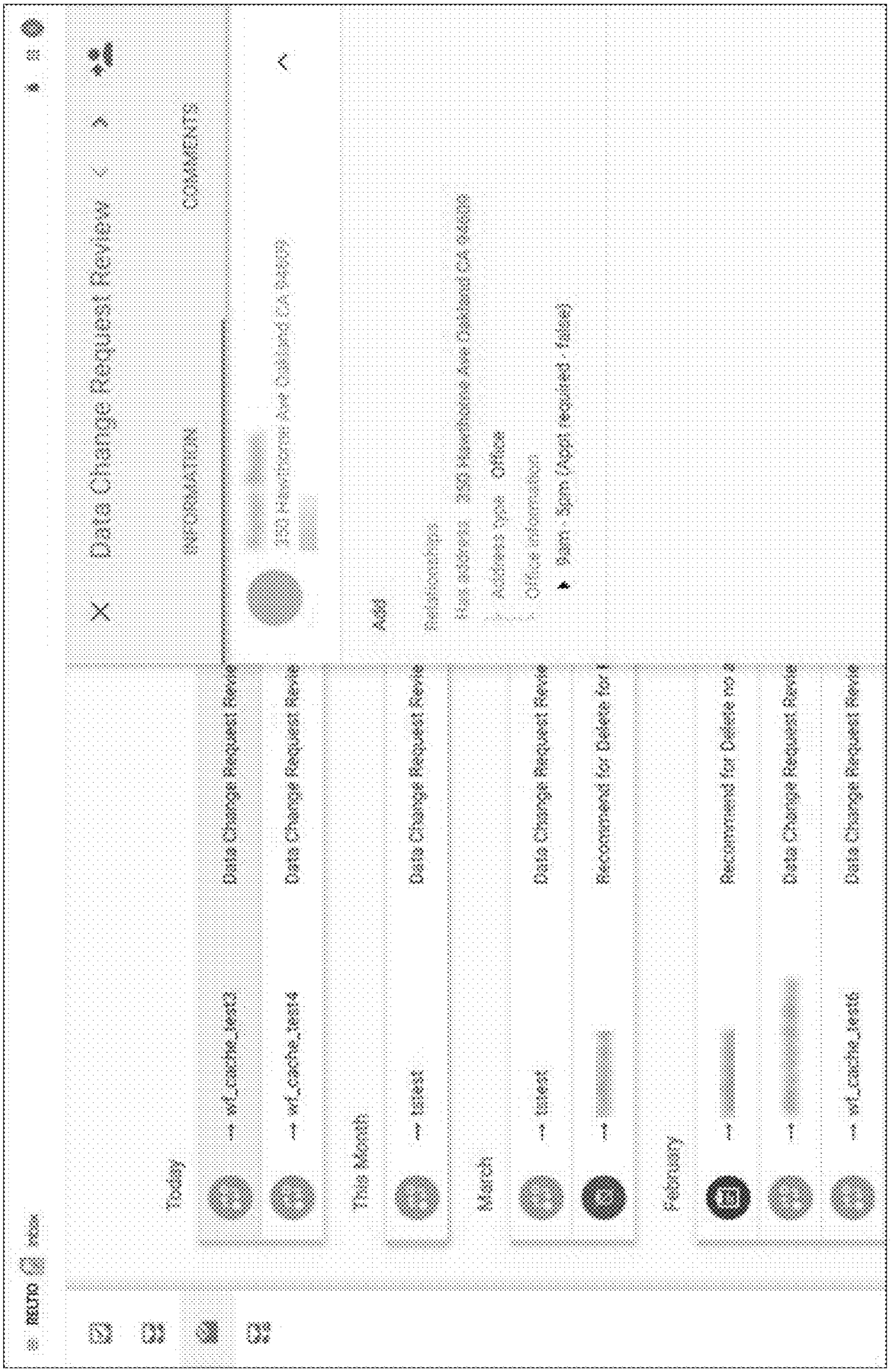
FIGS. 16, 17, and 18 depict changes to relationships and their attributes, or new or deleted relationships.
Figure 17:
Figure 18:
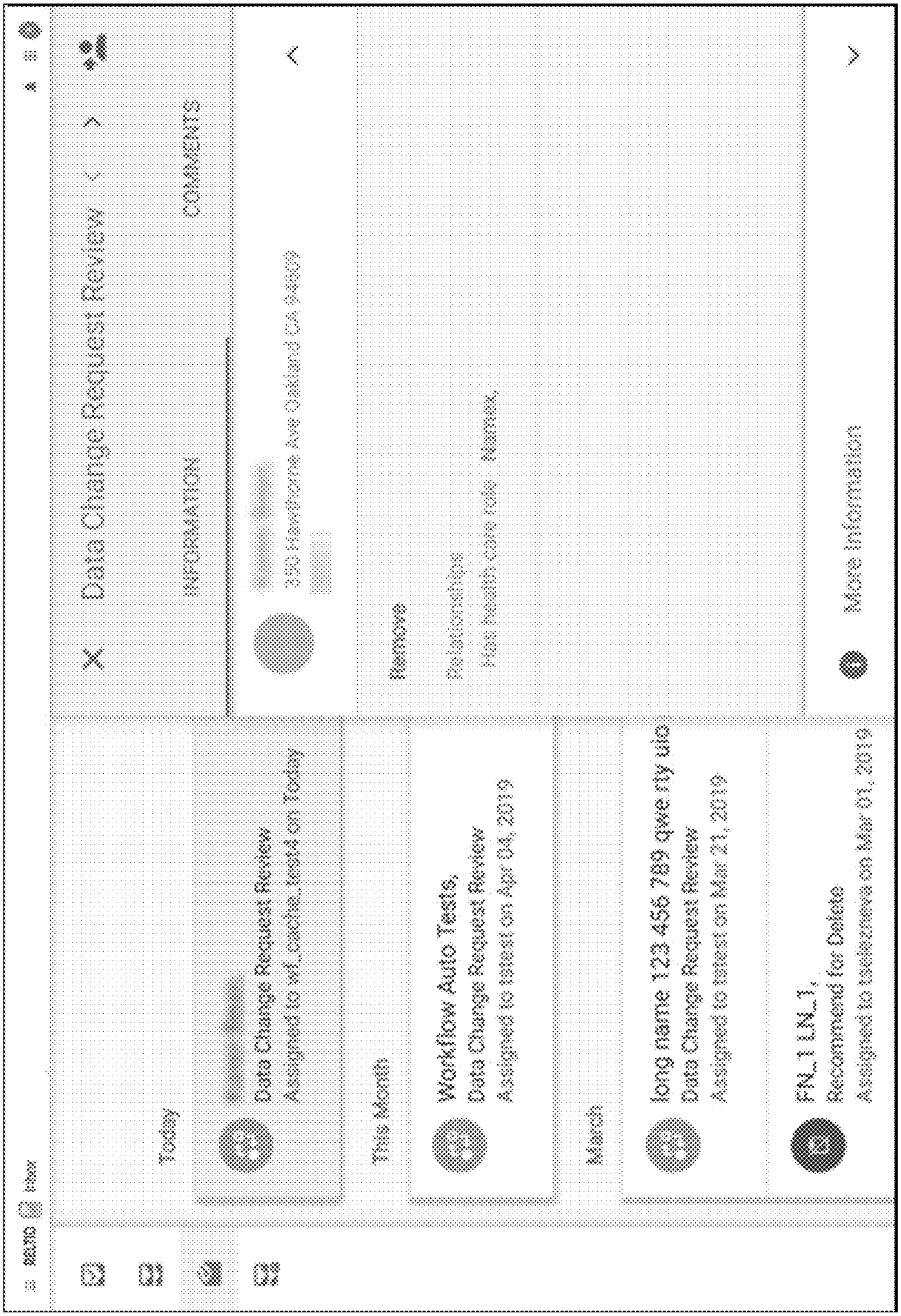

FIGS. 16, 17, and 18 depict changes to relationships and their attributes, or new or deleted relationships. If attributes have been added to an existing relationship, they may be visible at once with dashed lines from the title of the relationship to each attribute as depicted in FIG. 16. The same behavior occurs for attributes that have been changed. If a relationship was deleted, no attributers may be shown as depicted in the interface of FIG. 17 in some embodiments. If the user changes or deletes any attributes for a relationship, they are displayed similar to other attributes. Attributes for which no changes are made remain unaffected.

When a DCR is assigned to a user for review, the user may receive an email notification. When a DCR is approved or rejected, the DCR initiator may receive an email notification with the approval status, name of the approver, and comments from the person who approved. Partial reject may be automatically enabled for users who have the DELETE permission on the MDM: data.changeRequests role. Out-of-the-box workflow processes work with system role ROLE_REVIEWER, which does not have this permission. Therefore, existing customers may have this feature enabled automatically depending on permissions they have assigned to data stewards (workflow reviewers). Otherwise, customers must enable partial reject by using the User Management console application to create a new role with the exact permission (DELETE); assign this role to user/users/group of users on the relevant tenants; or Task Action—The task must be assigned to your user account.

The reviewer may partially reject the attributes in a Data Change Request for entities and relationships. This includes nested attributes and sub attributes of a nested attribute. In addition, the reviewer can reject the entire DCR that prevents the creation of the new entities or relationships. To partially reject changes, you first select the task by clicking on the task in the Inbox tab and view the detailed information on the right panel; when you mouse over the change, the REJECT option appears. Then you click the REJECT option corresponding to the change the reviewer wants to reject. The rejected changes may appear as struck out but are not deleted from the DCR till the task is approved. If you move to any other tab without approving the task, all rejections are canceled. If you choose not to reject the change from the DCR, click the UNREJECT button.

Example limitations to rejecting attributes in some embodiments include reject does not work for start/end dates, roles, and tags for new entities/relationships; and there is no validation of dependencies for rejected new entities. If there is a reference attribute for this entity, it will continue to exist without changes.

When changing a relationship, the old relationship is removed, and a new relationship is added. So, while rejecting the changes made to a relationship, both the actions remove and add may be rejected. If both the actions are not rejected, the following changes may take place: 1) No relationships may exist if the added relationship is rejected, and the removed relationship is applied; 2) Two relationships may exist if the added relationship is applied and the removed relationship is rejected.

Changes to relationships and their attributes, or new or deleted relationships, may be shown in the UI. In some embodiments, if a new relationship has been added and attributes are provided, a caret icon appears near the title of the relationship. Click the caret icon to see the added attributes. If attributes have been added to an existing relationship, they are visible at once with dashed lines from the title of the relationship to each attribute. The same behavior occurs for attributes that have been changed.

If the user change or delete any attributes for a relationship, they are displayed similar to other attributes. Attributes for which no changes are made remain unaffected. If a relationship was deleted, no attributes may be shown.

When a DCR is assigned to a user for review, the user may receive an email notification. When a DCR is approved or rejected, the DCR initiator gets an email notification with the approval status, name of the approver, and comments from the person who approved.

The platform 102 may provide the ability to manage a variety of data entities using Hub. A profile is a collection of all the data associated with an entity. Profiles contain the attributes for an entity, relationships for an entity, and sources for all of the attributes. It is possible that an entity attribute can have multiple sources and multiple values. The Operational Value (OV) is the current value for a given attribute, as defined by the survivorship rule for the attribute. The Profile pages enable you to view and manage the details for each entity in your tenant.

In various embodiments, Inbox enables a user to efficiently view, manage, and work on the business tasks assigned to a user or the user's team. The Inbox has filtering capabilities. Also, the user may create a workflow task and take action to review a potential match. As an assignee you can take required actions on a workflow task. The platform 102 provides an easy way to review potential matches from the Search view. Every workflow task can have variables associated with the entire workflow process or specific to a step. These variables usually have internal information that can be used in custom workflows.

The user may want to access Inbox from your mobile devices, such as Smartphones or Tablets. The mobile experience is optimized for smaller form factors with support for gestures.

Inbox: Lists tasks and displays information such as, name of the creator, status of the task, created date, and the due date. The task icon indicates the process the task belongs to. More than one process can be represented in the list, and the processes can be varied with regard to things like approving an expense report, matching tasks, and so on.

Team: Lists tasks assigned to the user's team members. Team members can perform any task, reassign any task, or simply view any task.

Sent: Lists tasks that you sent for approval.

All: Lists all open and closed tasks. The users who have the necessary permissions will be able to access the closed or resolved tasks. By default, closed tasks will be available in Inbox for a period of one year from the resolved or closed date.

Figure 19:
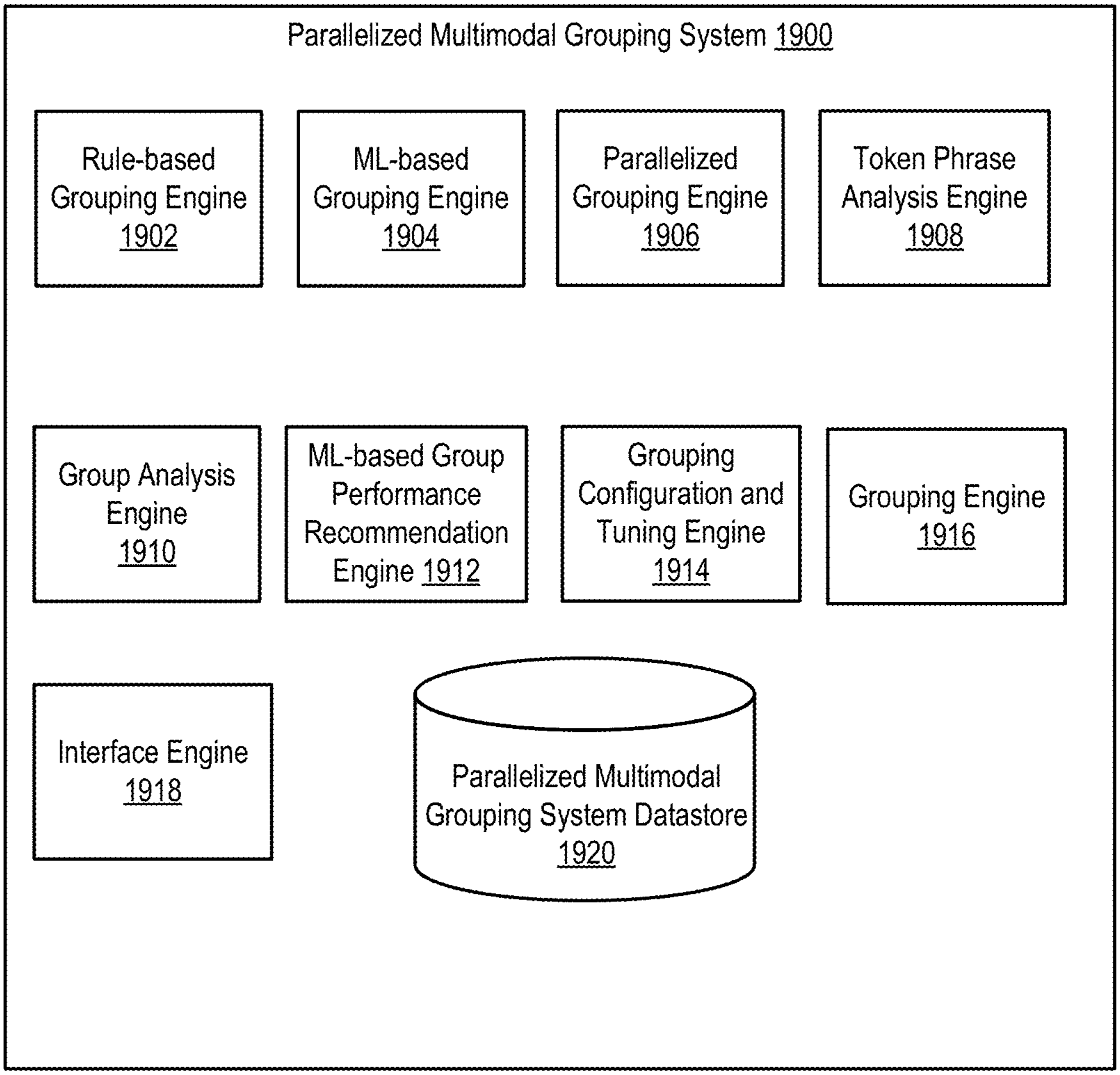
FIG. 19 depicts a diagram of an example parallelized multimodal grouping system for parallelized rules-based and machine learning-based grouping analysis and prediction.

FIG. 19 depicts a diagram 1900 of an example parallelized multimodal grouping system for parallelized rules-based and machine learning-based grouping analysis and prediction. In the example of FIG. 19, the parallelized multimodal grouping system 1900 includes a rules-based grouping engine 1902, a machine learning-based grouping engine 1904, a parallelized grouping engine 1906, a token phrase analysis engine 1908, a group analysis engine 1910, a machine learning-based group performance recommendation engine 1912, a grouping rule configuration and tuning engine 1914, a grouping engine 1916, an interface engine 1918, and a parallelized multimodal grouping system datastore 1920.

The rules-based grouping engine 1902 is intended to represent an engine that determines, based on one or more grouping rules, whether two or more data records of a set of data records (e.g., a set of data records of one or more tenants of a multi-tenant environment or system) can be or should be grouped together. For example, a grouping rule may be used to identify and/or group data records for a particular chain restaurant in a particular city (e.g., grouping all KFC restaurants in Boston, MA). As used herein, in some embodiments, reference to a "group" or "grouping" may include a group of data records and/or one or more data records that are candidates for grouping together (e.g., based on determinations made using one or more rules and/or machine learning models).

In some embodiments, more specifically, the rules-based grouping engine 1902 can function to determine whether an entity (e.g., a person, organization, product, and/or the like) associated with a data record should be grouped with any other data records. In some embodiments, grouping rules include comparison formulas that are responsible for comparing data records with each other. In one example, a comparison formula within a grouping rule may be used to adjudicate candidate groupings and can evaluate to true or false (or a score if grouping is based on relevance).

In some embodiments, users can directly add, modify, and/or delete grouping rules (e.g., via a graphical user interface generated by interface engine 1918) which can then be immediately deployed in a production environment by the rules-based grouping engine 1902. For example, the system 1900 may include comparison databases that include similar terms which can be mapped to each other. For example, Bill may map to William such that a rule may identify a match between a data record including a first name of Bill and another data record with a first name of William. By allowing users the ability to directly modify rules (e.g., to add new mappings) and have those mappings immediately deployed, rule deployment times and the complexity of rule structures can both be reduced.

In some embodiments, the rules-based grouping engine 1902 can function to identify grouping rules for execution (e.g., on a set of data records). For example, a grouping rule can be configured to identify whether at least two different data records are each associated with the same entity (e.g., person, organization, product, and/or the like) and same data record fields and/or field values. The plurality of different data records may be deployed in a live multi-tenant production environment.

The machine learning-based grouping engine 1904 is intended to represent an engine that determines, based on one or more grouping machine learning models, whether any data records should be grouped with any other data records. For example, the grouping machine learning models may include one or more machine learning models that have been trained on various datasets (e.g., domain-specific datasets, enterprise-specific datasets, tenant-specific datasets, comparison database datasets, and the like) to identify groups more accurately even when data records have different structures, formats, and/or information. In one example, the machine learning-based grouping engine 1904 implements one or more similarity algorithms or models to determine groups. In some embodiments, the machine learning-based grouping engine 1904 and the rules-based grouping engine 1902 are configured for parallel execution (e.g., by the parallelized grouping engine 1906).

In some embodiments, rules-based grouping and machine learning-based grouping can each identify data records for grouping based on one or more fields and/or field values of the data records (e.g., city, organization name). For example, a grouping may be determined for all Acme restaurants in Austin, TX, and the engines and systems described herein can determine the groupings based on those fields and/or field values.

The parallelized grouping engine 1906 is intended to represent an engine that executes and/or manages the parallelized execution of rules (e.g., grouping rules) and machine learning models (e.g., grouping machine learning models). This can, for example, enable the system 1900 to identify potential data record groupings, group data records, reduce computational requirements (e.g., memory, storage, processors) of subsequent operations on the data records, and provide a user with a higher confidence of a grouping.

The token phrase analysis engine 1908 is intended to represent an engine that determines a quantity and/or quality of determined data record groupings. For example, the token phrase analysis engine 1908 may determine a quantity of data record groupings produced by one or more rules or machine learning models and cooperate with the group analysis engine 1910 to determine the quality of those groupings. For example, threshold values may indicate whether too many or too few groupings are being determined.

The group analysis engine 1910 is intended to represent an engine that determines the performance of grouping rules and/or grouping machine learning models. In some embodiments, embodiments, the group analysis engine 1910 can analyze grouping rules and/or grouping machine learning models in a live multi-tenant production environment. For example, the group analysis engine 1910 may identify, on-the-fly, redundant grouping rules (e.g., grouping rules that produce substantially similar results), grouping rules that are too broad in scope (e.g., grouping rules that produce too many grouping results), grouping rules that are too narrow in scope (e.g., grouping rules that produce too few grouping results or grouping rules that are never triggered), and the like. The group analysis engine 1910 may include analysis rules and/or analysis machine learning models to determine grouping rule and/or grouping machine learning model performance.

The machine learning-based group performance recommendation engine 1912 is intended to represent an engine that generates group recommendation actions based on one or more machine learning models and the performances of the associated grouping rules and/or grouping machine learning models. For example, the machine learning-based group performance recommendation engine 1912 may include one or more machine learning models that use group analysis (e.g., generate by the group analysis engine 1910) to determine one or more corrective actions to improve the performance of the corresponding grouping rules and/or grouping machine learning models. Recommendation actions can include, for example, recommendation to add rules, modify rules, delete rules, merge rules, add machine learning models, modify machine learning models, delete machine learning models, merge machine learning models, and/or the like. The machine learning-based group performance recommendation engine 1912 may also generate an explanation describing the reasoning used to determine the corrective actions.

In some embodiments, the machine learning-based group performance recommendation engine 1912 can execute and provide recommendations automatically and/or in real-time. For example, the group analysis engine 1910 may execute continuously and/or in real-time in a live production environment and generate analysis and flag potentially problematic grouping rules and grouping machine learning models. The machine learning-based group performance recommendation engine 1910 may immediately process those rules and/or machine learning models and generate corresponding recommendations without any intervention from a user.

In some embodiments, the machine learning-based group performance recommendation engine 1912 can function to execute grouping rule recommendation actions. The machine learning-based group performance recommendation engine 1912 may execute recommendation actions based on user input (e.g., received through a graphical user interface generated by the interface engine 1918) and/or automatically. For example, the machine learning-based group performance recommendation engine 1912 may execute, without requiring user input, actions to add rules, modify rules, delete rules, merge rules, add machine learning models, modify machine learning models, delete machine learning models, merge machine learning models, and/or the like.

The grouping rule configuration and tuning engine 1914 is intended to represent an engine that configures and/or tunes grouping rules and grouping machine learning models based on user input and/or automatically (e.g., without requiring user input). For example, the grouping rule configuration and tuning engine may allow a user (e.g., via a graphical user interface generated by the interface engine 1918) to modify rules, add rules, and/or the like, as described elsewhere herein. The grouping rule configuration and tuning engine 1914 may also implement reinforcement learning and/or other techniques that can improve rule and model performance based on user feedback (e.g., user inputs indicating to group or not group records that are indicated as candidate for grouping).

The grouping rule configuration and tuning engine 1914 can also function to test different grouping rules and/or grouping machine learning model deployment schemes prior to deployment. For example, a user may provide various grouping rules and/or machine learning models and the grouping rule configuration and tuning engine 1914 can simulate how group performance may improve or decrease based on the tested schemes. This can, for example, reduce the computational impact of deploying harmful rules and/or machine learning models.

In some embodiments, the grouping rule configuration and tuning engine 1914 can configure and/or tune grouping rules and grouping machine learning models based on user inputs received in response to prompts generated by the grouping rule configuration and tuning engine 1914. For example, the grouping rule configuration and tuning engine 1914 may prompt a user with various questions, such as "Are John and Johnny the same person?" and the grouping rule configuration and tuning engine 1914 can configure and tune one or more grouping rules or grouping machine learning models based on the response.

The grouping engine 1916 is intended to represent an engine that can group two or more data records that are candidates for grouping (e.g., as determined by the rules-based grouping engine 1092 and/or the machine learning model-based grouping engine 1904). For example, the grouping engine 1916 can group a first data record with a second data record and create a new group for those records and/or update an existing group to include those records. It will be appreciated that, in some embodiments, the functionality described herein with respect to data records can also be applied to groups (or, groupings). Thus, for example, groups may be analyzed to determine whether different groups should be merged, and the grouping engine 1916 can function to merge different groups.

In some embodiments, the grouping engine 1916 can function to identify candidate data records for potential grouping. More specifically, the grouping engine 1916 may identify various data records (e.g., data records of a live multi-tenant enterprise environment). Each data record may be associated with an entity (e.g., person, organization, enterprise, product), and each data record may include various record fields (e.g., first name, last name, social security number, email address, phone number, city, state, county, zip code, area code, country, organization, and the like) and corresponding record field values (e.g., John, Doe, 555-55-5555, john.doe@domain.com, 555-555-5555, Boston, MA, Suffolk, 02109, 617, USA, Acme, and the like).

The grouping engine 1916 may identify candidate records that have the same corresponding field values, as well as records that have different values, format, structure, and the like.

The interface engine 1918 is intended to represent an engine that presents visual, audio, and/or haptic information. In some implementations, the interface engine 1918 generates graphical user interface components (e.g., server-side graphical user interface components) that can be rendered as complete graphical user interfaces on various systems (e.g., client systems). The interface engine 1918 can function to present an interactive graphical user interface for display and receiving information.

In some embodiments, the interface engine 1918 can function to present graphical user interface elements of graphical user interfaces. More specifically, the interface engine 1918 may generate graphical user interface elements indicating a type of process used to determine a potential grouping. For example, one graphical user interface element may indicate that a potential grouping was determined using grouping rules, while another graphical user interface element may indicate that another potential grouping was determined using machine learning. This can allow a user to have more confidence when determining whether to group records. For example, having both indications may increase the likelihood that the data records should be grouped.

The parallelized multimodal grouping system datastore 1920 is intended to represent a datastore that can store and/or manage the rules, machine learning models, group determinations, group analyses, group recommendation actions, and/or other inputs, outputs, and communications described herein.

Figure 20:
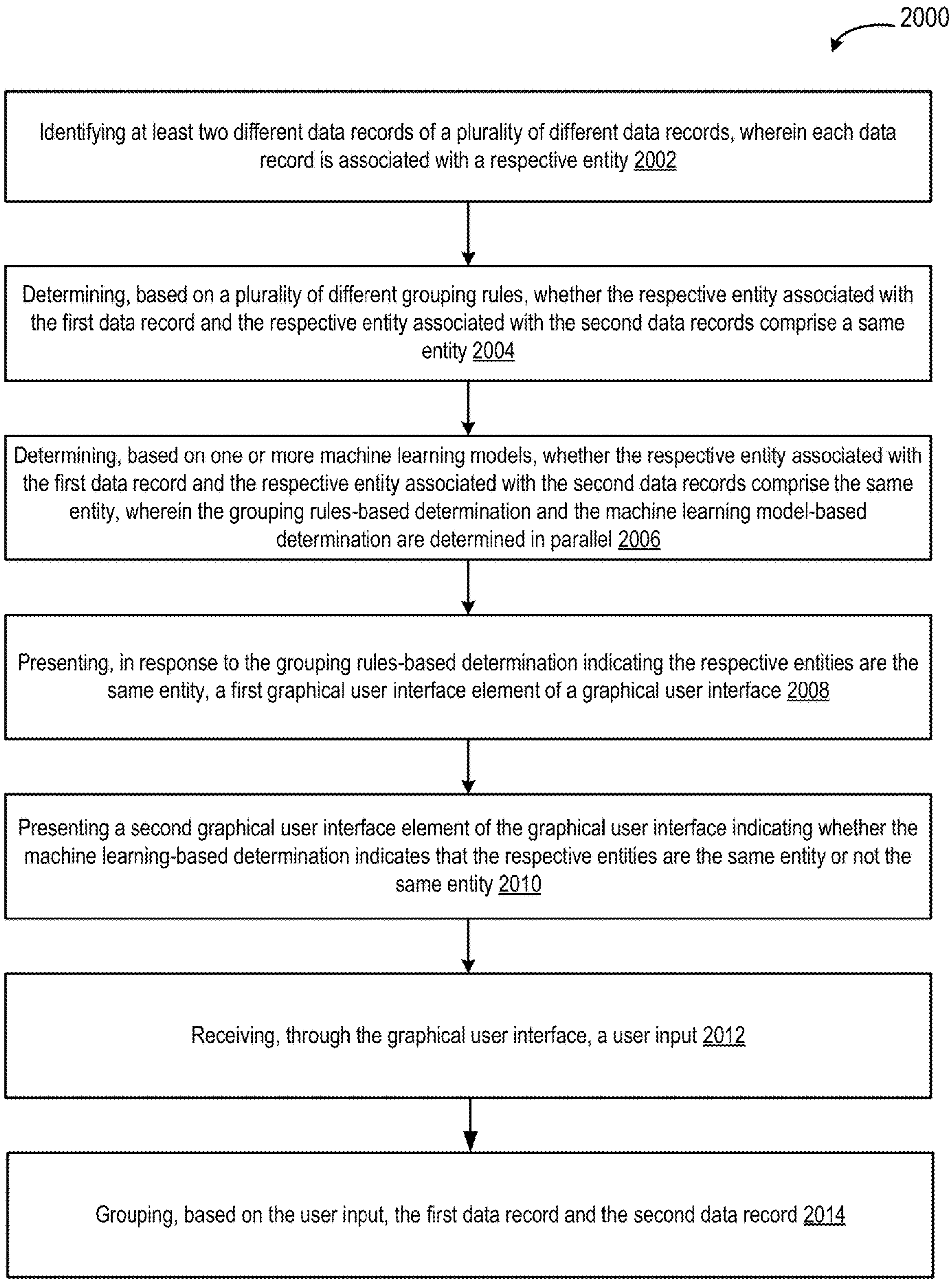
FIG. 20 depicts a flowchart of an example method of interactive parallelized multimodal grouping.

FIG. 20 depicts a flowchart 2000 of an example method of interactive parallelized multimodal grouping. In this and other flowcharts, flow diagrams, and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed but may have been included for the sake of illustrative clarity.

In module 2002, a parallelized multimodal grouping system identifies at least two different data records of a plurality of different data records. Each data record may be associated with a respective entity, and each data record may include a plurality of respective record fields and corresponding record field values. At least a first record field value of a first data record is different from a corresponding first record field value of a second data.

In module 2004, the parallelized multimodal grouping system determines, based on a plurality of different grouping rules, whether the respective entity associated with the first data record and the respective entity associated with the second data record comprise a same entity. In some embodiments, a rules-based grouping engine determines whether the respective entity associated with the first data record and the respective entity associated with the second data record comprise a same entity based on the rules.

In module 2006, the parallelized multimodal grouping system determines, based on one or more machine learning models and in parallel with the rules-based determination and, whether the respective entity associated with the first data record and the respective entity associated with the second data record comprise the same entity. In some embodiments, a machine learning-based grouping engine determines whether the respective entity associated with the first data record and the respective entity associated with the second data record comprise the same entity based on the one or more machine learning models.

In module 2008, the parallelized multimodal grouping system presents, in response to the rules-based determination indicating the respective entities are the same entity, a first graphical user interface element of a graphical user interface. In some embodiments, the interface engine presents the graphical user interface and the first graphical user interface element.

In module 2010, the parallelized multimodal grouping system presents a second graphical user interface element of the graphical user interface indicating whether the machine learning-based determination indicates that the respective entities are the same entity or not the same entity. In some embodiments, the interface engine presents the graphical user interface and the second graphical user interface element.

In module 2012, the parallelized multimodal grouping system receives, through the graphical user interface, a user input. In some embodiments, an interface engine generates the graphical user interface that receives the user input.

In module 2014, the parallelized multimodal grouping system groups, based on the user input, the first data record and the second data record. In some embodiments, a parallelized grouping engine groups the data records.

Figure 21:
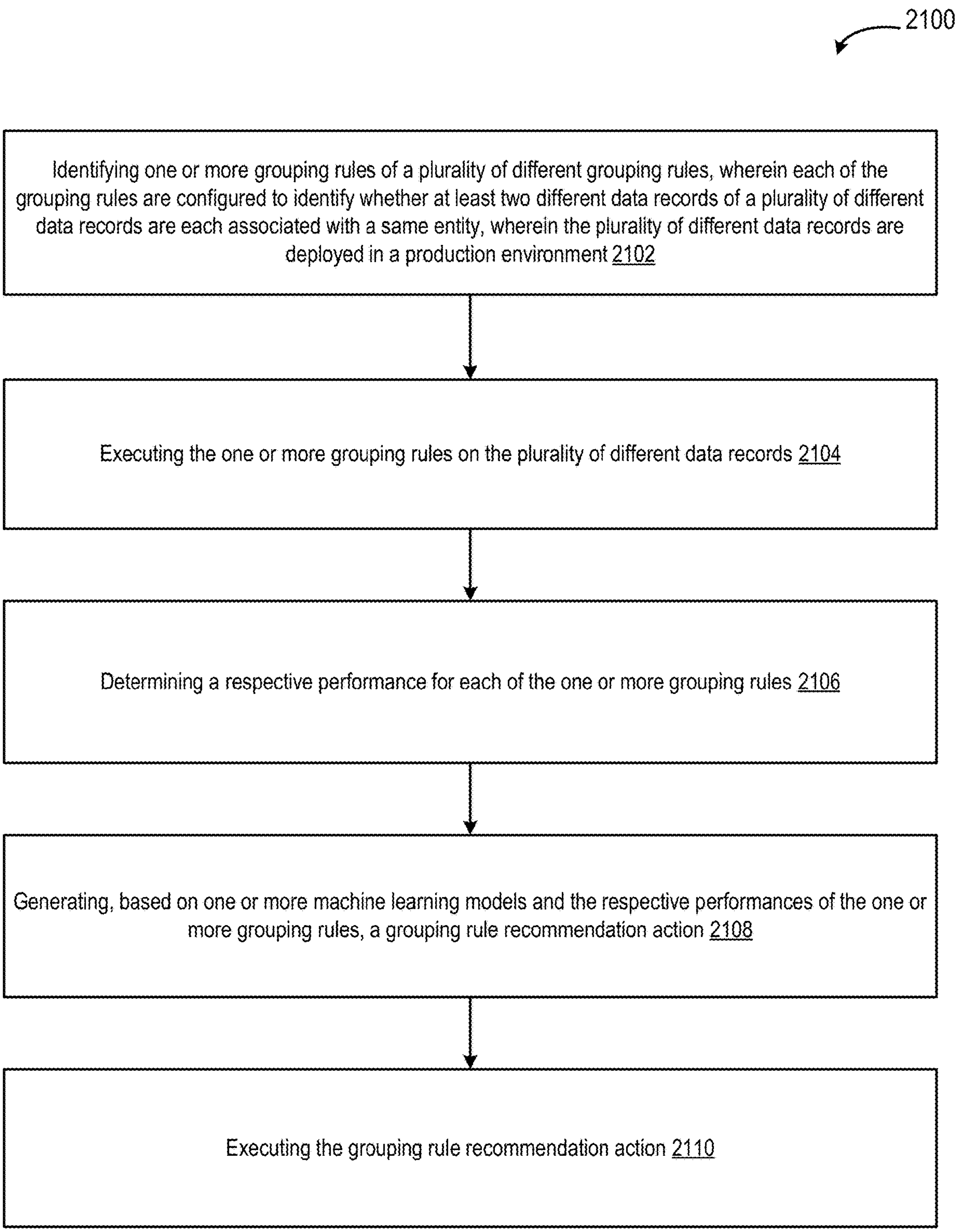
FIG. 21 depicts a flowchart of an example method of analyzing grouping rules and generating machine learning-based grouping rule recommendation actions.

FIG. 21 depicts a flowchart 2100 of an example method of analyzing grouping rules and generating machine learning-based grouping rule recommendation actions. In this and other flowcharts, flow diagrams, and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed but may have been included for the sake of illustrative clarity.

In module 2102, a parallelized multimodal grouping system identifies one or more grouping rules of a plurality of different grouping rules. Each of the grouping rules can be configured to identify whether at least two different data records of a plurality of different data records (e.g., data records of a big data enterprise environment) are each associated with a same entity (e.g., person, organization, product, and/or the like). The plurality of different data records may be deployed in a production environment (e.g., live data of a production enterprise environment). In some embodiments, a rules-based grouping engine identifies the grouping rules.

In module 2104, the parallelized multimodal grouping system executes the one or more grouping rules on the plurality of different data records. In some embodiments, the rules-based grouping engine executes the grouping rules.

In module 2106, the parallelized multimodal grouping system determines a respective performance for each of the one or more grouping rules. In some embodiments, a group analysis engine determines the respective performance for each grouping rule.

In module 2108, the parallelized multimodal grouping system generates, based on one or more machine learning models and the respective performances of the one or more grouping rules, a grouping rule recommendation action. In some embodiments, a machine learning-based group performance recommendation engine generates the grouping rule recommendation action.

In module 2110, the parallelized multimodal grouping system executes the grouping rule recommendation action. In some embodiments, the machine learning-based group performance recommendation engine and/or a grouping engine executes the grouping rule recommendation action.

What is claimed is:

1. A system comprising:

one or more processors; and memory storing instructions that, when executed by the one or more processors, cause the system to perform:

identifying at least two different data records of a plurality of different data records of a lineage-persistent relational database management system (RDBMS), wherein each data record of the plurality of different data records of the lineage-persistent RDBMS is associated with a respective entity, wherein each data record of the plurality of different data records of the lineage-persistent RDBMS includes a plurality of respective record fields and corresponding record field values, and wherein at least a first record field value of a first data record of the plurality of different data records of the lineage-persistent RDBMS is different from a corresponding first record field value of a second data record of the plurality of different data records of the lineage-persistent RDBMS;

determining, based on a plurality of different grouping rules, whether the respective entity associated with the first data record of the plurality of different data records of the lineage-persistent RDBMS and the respective entity associated with the second data record of the plurality of different data records of the lineage-persistent RDBMS comprise a same entity;

determining, based on one or more machine learning models, whether the respective entity associated with the first data record of the plurality of different data records of the lineage-persistent RDBMS and the respective entity associated with the second data record of the plurality of different data records of the lineage-persistent RDBMS comprise the same entity, wherein the grouping rules-based determination and the machine learning model-based determination are determined in parallel;

presenting, in response to the grouping rules-based determination indicating the respective entities are the same entity, a first graphical user interface element of a graphical user interface;

presenting a second graphical user interface element of the graphical user interface indicating whether the machine learning-based determination indicates that the respective entities are the same entity or not the same entity;

receiving, through the graphical user interface based on the presented first graphical user interface element and the second graphical user interface element, a user input;

grouping, based on the user input, the first data record of the plurality of different data records of the lineage-persistent RDBMS and the second data record of the plurality of different data records of the lineage-persistent RDBMS;

determining a respective performance for each of the one or more machine learning models;

generating, based on one or more other machine learning models and the respective performances of the one or more machine learning models, a grouping rule recommendation action;

executing the grouping rule recommendation action, wherein executing the grouping rule recommendation action causes a modification of the one or more machine learning models based on the respective performances of the one or more machine learning models.

2. The system of claim 1, wherein the instructions further cause the system to perform:

determining a respective performance for each of the plurality of different grouping rules;

generating, based on one or more other machine learning models and the respective performances of plurality of different grouping rules, a grouping rule recommendation action;

executing the grouping rule recommendation action.

3. A system comprising:

one or more processors; and memory storing instructions that, when executed by the one or more processors, cause the system to perform:

identifying one or more grouping rules of a plurality of different grouping rules, wherein each of the grouping rules is configured to identify whether at least two different data records of a plurality of different data records of a lineage-persistent relational database management system (RDBMS) are each associated with a same entity, and wherein the plurality of different data records of the lineage-persistent RDBMS are deployed in a production environment;

executing the one or more grouping rules on the plurality of different data records;

determining a respective performance for each of the one or more grouping rules;

generating, based on one or more machine learning models and the respective performances of the one or more grouping rules, a grouping rule recommendation action;

executing the grouping rule recommendation action, wherein executing the grouping rule recommendation action causes a modification of the one or more grouping rules based on the respective performances of the one or more grouping rules.

4. A method implemented by a computing system including one or more processors and storage media storing machine-readable instructions, wherein the method is performed using the one or more processors, the method comprising:

identifying at least two different data records of a plurality of different data records of a lineage-persistent relational database management system (RDBMS), wherein each data record of the plurality of different data records of the lineage-persistent RDBMS is associated with a respective entity, wherein each data record of the plurality of different data records of the lineage-persistent RDBMS includes a plurality of respective record fields and corresponding record field values, and wherein at least a first record field value of a first data record of the plurality of different data records of the lineage-persistent RDBMS is different from a corresponding first record field value of a second data record of the plurality of different data records of the lineage-persistent RDBMS;

determining, based on a plurality of different grouping rules, whether the respective entity associated with the first data record of the plurality of different data records of the lineage-persistent RDBMS and the respective entity associated with the second data record of the plurality of different data records of the lineage-persistent RDBMS comprise a same entity;

determining, based on one or more machine learning models, whether the respective entity associated with the first data record of the plurality of different data records of the lineage-persistent RDBMS and the respective entity associated with the second data record of the plurality of different data records of the lineage-persistent RDBMS comprise the same entity, wherein the grouping rules-based determination and the machine learning model-based determination are determined in parallel;

presenting, in response to the grouping rules-based determination indicating the respective entities are the same entity, a first graphical user interface element of a graphical user interface;

presenting a second graphical user interface element of the graphical user interface indicating whether the machine learning-based determination indicates that the respective entities are the same entity or not the same entity;

receiving, through the graphical user interface based on the presented first graphical user interface element and the second graphical user interface element, a user input;

grouping, based on the user input, the first data record of the plurality of different data records of the lineage-persistent RDBMS and the second data record of the plurality of different data records of the lineage-persistent RDBMS;

determining a respective performance for each of the one or more machine learning models;

generating, based on one or more other machine learning models and the respective performances of the one or more machine learning models, a grouping rule recommendation action;

executing the grouping rule recommendation action, wherein executing the grouping rule recommendation action causes a modification of the one or more machine learning models based on the respective performances of the one or more machine learning models.

5. A method implemented by a computing system including one or more processors and storage media storing machine-readable instructions, wherein the method is performed using the one or more processors, the method comprising:

identifying one or more grouping rules of a plurality of different grouping rules, wherein each of the grouping rules is configured to identify whether at least two different data records of a plurality of different data records of a lineage-persistent relational database management system (RDBMS) are each associated with a same entity, and wherein the plurality of different data records of the lineage-persistent RDBMS are deployed in a production environment;

executing the one or more grouping rules on the plurality of different data records;

determining a respective performance for each of the one or more grouping rules;

generating, based on one or more machine learning models and the respective performances of the one or more grouping rules, a grouping rule recommendation action;

executing the grouping rule recommendation action, wherein executing the grouping rule recommendation action causes a modification of the one or more grouping rules based on the respective performances of the one or more grouping rules.

* * * * *